(12) United States Patent
Lim et al.

(10) Patent No.: US 10,438,559 B2
(45) Date of Patent: Oct. 8, 2019

(54) ELECTRONIC DEVICE SUPPORTING USB INTERFACE AND CONTROL METHOD FOR USB INTERFACE

(71) Applicant: SAMSUNG ELECTRONICS CO., LTD., Suwon-si, Gyeonggi-do (KR)

(72) Inventors: Ho Yeong Lim, Suwon-si (KR); Du Hyun Kim, Yongin-si (KR); Yong Seung Yi, Seoul (KR); Je Kook Kim, Yongin-si (KR); Tae Lee Lee, Suwon-si (KR); Dong Il Son, Hwaseong-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 0 days.

(21) Appl. No.: 15/629,824

(22) Filed: Jun. 22, 2017

(65) Prior Publication Data

US 2018/0018934 A1 Jan. 18, 2018

(30) Foreign Application Priority Data

Jul. 12, 2016 (KR) .................... 10-2016-0087816

(51) Int. Cl.
*G06F 13/14* (2006.01)
*G09G 5/00* (2006.01)
(Continued)

(52) U.S. Cl.
CPC ............. *G09G 5/006* (2013.01); *G06F 13/24* (2013.01); *G06F 13/385* (2013.01);
(Continued)

(58) Field of Classification Search
CPC ............. G06F 13/4068; G06F 13/4022; G06F 1/1613; G06F 21/85; G06F 2213/0042; G09G 2370/22; G09G 5/006
See application file for complete search history.

(56) References Cited

U.S. PATENT DOCUMENTS 7,365,454 B2 4/2008 Morrow
7,791,312 B2 9/2010 Kook
(Continued)

FOREIGN PATENT DOCUMENTS

JP 2012-074798 4/2012

OTHER PUBLICATIONS

Extended Search Report dated Dec. 13, 2017 in counterpart European Patent Application No. 17179029.8.
(Continued)

*Primary Examiner* — Hau H Nguyen
(74) *Attorney, Agent, or Firm* — Nixon & Vanderhye P.C.

(57) ABSTRACT

An electronic device includes a housing, a display device exposed through a first part of the housing, a recess formed in a second part of the housing, a receptacle formed in the recess, a plurality of conductive contacts disposed inside the receptacle and including a first contact, a first circuit that supplies and/or receives a current of a first level or larger to and/or from the first contact when an external connector is inserted into the receptacle, a first switching device that electrically connects the first circuit with the first contact or to interrupt a connection between the first circuit and the first contact, a second circuit that detects existence of a foreign object contacting the first contact while the external connector is inserted into the receptacle and a control circuit that controls the first switching device based at least in part on information regarding the detected existence of the foreign object.

19 Claims, 24 Drawing Sheets

(51) Int. Cl.
*G06F 13/24* (2006.01)
*G06F 13/38* (2006.01)
*G06F 13/40* (2006.01)
*G06F 13/42* (2006.01)
*H01R 13/66* (2006.01)
*H01R 24/60* (2011.01)
*H01R 107/00* (2006.01)

(52) U.S. Cl.
CPC ...... *G06F 13/4022* (2013.01); *G06F 13/4068* (2013.01); *G06F 13/4282* (2013.01); *H01R 13/6683* (2013.01); *H01R 24/60* (2013.01); *G06F 2213/2416* (2013.01); *G09G 2320/08* (2013.01); *G09G 2370/04* (2013.01); *G09G 2370/22* (2013.01); *H01R 2107/00* (2013.01); *Y02D 10/14* (2018.01); *Y02D 10/151* (2018.01)

(56) References Cited

U.S. PATENT DOCUMENTS

| | | | |
|---|---|---|---|
| 7,936,147 | B2 | 5/2011 | Kook |
| 8,994,445 | B2 | 3/2015 | Sakai |
| 9,047,073 | B2 | 6/2015 | Osaki et al. |
| RE46,111 | E | 8/2016 | Kook |
| 9,490,625 | B2 | 11/2016 | Tanimoto et al. |
| 9,583,975 | B2 | 2/2017 | Talmola et al. |
| 9,606,953 | B2 | 3/2017 | Talmola |
| 9,608,386 | B2 | 3/2017 | Jenkins et al. |
| 2004/0156151 | A1 | 8/2004 | Morrow |
| 2009/0261778 | A1 | 10/2009 | Kook |
| 2010/0289450 | A1 | 11/2010 | Kook |
| 2012/0210023 | A1 | 8/2012 | Ozaki et al. |
| 2013/0271206 | A1 | 10/2013 | Sakai |
| 2015/0049407 | A1 | 2/2015 | Tanimoto et al. |
| 2015/0229161 | A1 | 8/2015 | Talmola et al. |
| 2015/0261714 | A1 | 9/2015 | Talmola |
| 2015/0311650 | A1 | 10/2015 | Jenkins et al. |
| 2016/0056588 | A1 | 2/2016 | Motoichi |
| 2016/0141822 | A1* | 5/2016 | Hijazi ................ H01R 13/6595 361/679.31 |
| 2017/0110835 | A1* | 4/2017 | Hasegawa .......... H01R 13/6683 |
| 2017/0115711 | A1* | 4/2017 | Jaramillo ................ G06F 1/266 |
| 2017/0124010 | A1* | 5/2017 | Whitby-Strevens ........................ G06F 13/385 |
| 2017/0187152 | A1 | 9/2017 | Jenkins et al. |

OTHER PUBLICATIONS

Search Report dated Oct. 26, 2017 in counterpart International Patent Application No. PCT/KR2017/006525.
Rogers, Andrew, "Introdution to USB Type-C," AN1953, 2015 Microchip Technology Inc., <http://ww1.microchip.com/downloads/en/AppNotes/00001953A.pdf>.

* cited by examiner

| Logic Operating Range : 2.4~5.5V | VOLTAGE Range |
|---|---|
| Power source advertisement : Default USB (80uA, Rd 5.1K, Ra 1K, MOISTURE) | |
| Ra | 80mV |
| Rd | 412mV |
| MOISTURE(>5.1K) | 412mV-2.4V |
| Rp(Open) | 2.4V |
| Power source advertisement : 1.5A@5V (180uA, Rd 5.1K, Ra 1K, MOISTURE) | |
| Ra | 180mV |
| Rd | 918mV |
| MOISTURE(>5.1K) | 918mV-2.4V |
| Rp(Open) | 2.4V |
| Power source advertisement : 3.0A@5V (330uA, Rd 5.1K, Ra 1K, MOISTURE) | |
| Ra | 330mV |
| Rd | 1.683V |
| MOISTURE(>5.1K) | 1.683V-2.4V |
| Rp(Open) | 2.4V |

ELECTRONIC DEVICE SUPPORTING USB INTERFACE AND CONTROL METHOD FOR USB INTERFACE

CROSS-REFERENCE TO RELATED APPLICATION

This application is based on and claims priority to a Korean patent application filed on Jul. 12, 2016 in the Korean Intellectual Property Office and assigned Serial number 10-2016-0087816, the disclosure of which is incorporated by reference herein in its entirety.

TECHNICAL FIELD

The present disclosure relates generally to an electronic device that communicates with an external device through a universal serial bus (hereinafter referred to as "USB").

BACKGROUND

A data transmission standard (e.g., USB) is an industrial data bus standard used to transmit digital data between electronic devices. A transmission speed of the USB 3.1 type that is being currently used is ten times faster than that of the USB 2.0 type, and the USB 3.1 type is used to transmit high-definition content. According to various embodiments, in the case of the USB 3.1 type, the role of an external device, which is connected to each plug, for example, a USB host or a USB device may be relatively determined.

A specific current is periodically applied to an identification contact (e.g., a CC1 contact or a CC2 contact) to define the role of the external device connected to each plug of the USB 3.1 type. In this case, when a foreign object (e.g., moisture) flows into a plug, electrolytic corrosion may occur at the identification contact.

SUMMARY

Example aspects of the present disclosure address at least the above-mentioned problems and/or disadvantages and provide at least the advantages described below. Accordingly, an example aspect of the present disclosure is to provide a method of controlling a USB interface that controls a current applied to an identification contact to prevent and/or reduce corrosion and an electronic device supporting the same.

In accordance with an example aspect of the present disclosure, an electronic device is provided. The electronic device may include a housing, a display device exposed through a first part of the housing, a recess formed in a second part of the housing, a receptacle formed in the recess, a plurality of conductive contacts disposed inside the receptacle and including a first contact, a first circuit configured to supply and/or receive a current of a first level or larger to and/or from the first contact when an external connector is inserted into the receptacle, a first switching device comprising switching circuitry configured to electrically connect the first circuit with the first contact or to interrupt a connection between the first circuit and the first contact, a second circuit configured to sense existence of a foreign object contacting the first contact while the external connector is inserted into the receptacle and a control circuit configured to control the first switching device based at least in part on sensing the existence of the foreign object.

In accordance with another example aspect of the present disclosure, a method of controlling an operation of an electronic device is provided. The method may include sensing existence of a foreign object contacting a first contact disposed inside a receptacle if an external connector is inserted into the receptacle including a USB interface, controlling a switching device based at least in part on sensing the existence of the foreign object and applying a current of a first level or larger to the first contact under control of the switching device.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and attendant advantages of the present disclosure will be more apparent and readily appreciated from the following detailed description, taken in conjunction with the accompanying drawings, in which like reference numerals refer to like elements, and wherein:

FIG. 13 is a table illustrating an example voltage detected at an identification contact, according to various example embodiments of the present disclosure;

FIG. 14 is a table illustrating example impedance detected at an identification contact depending on existence of a foreign object, according to various example embodiments of the present disclosure;

Throughout the drawings, it should be noted that like reference numbers are used to depict the same or similar elements, features, and structures.

DETAILED DESCRIPTION

Figure 1:
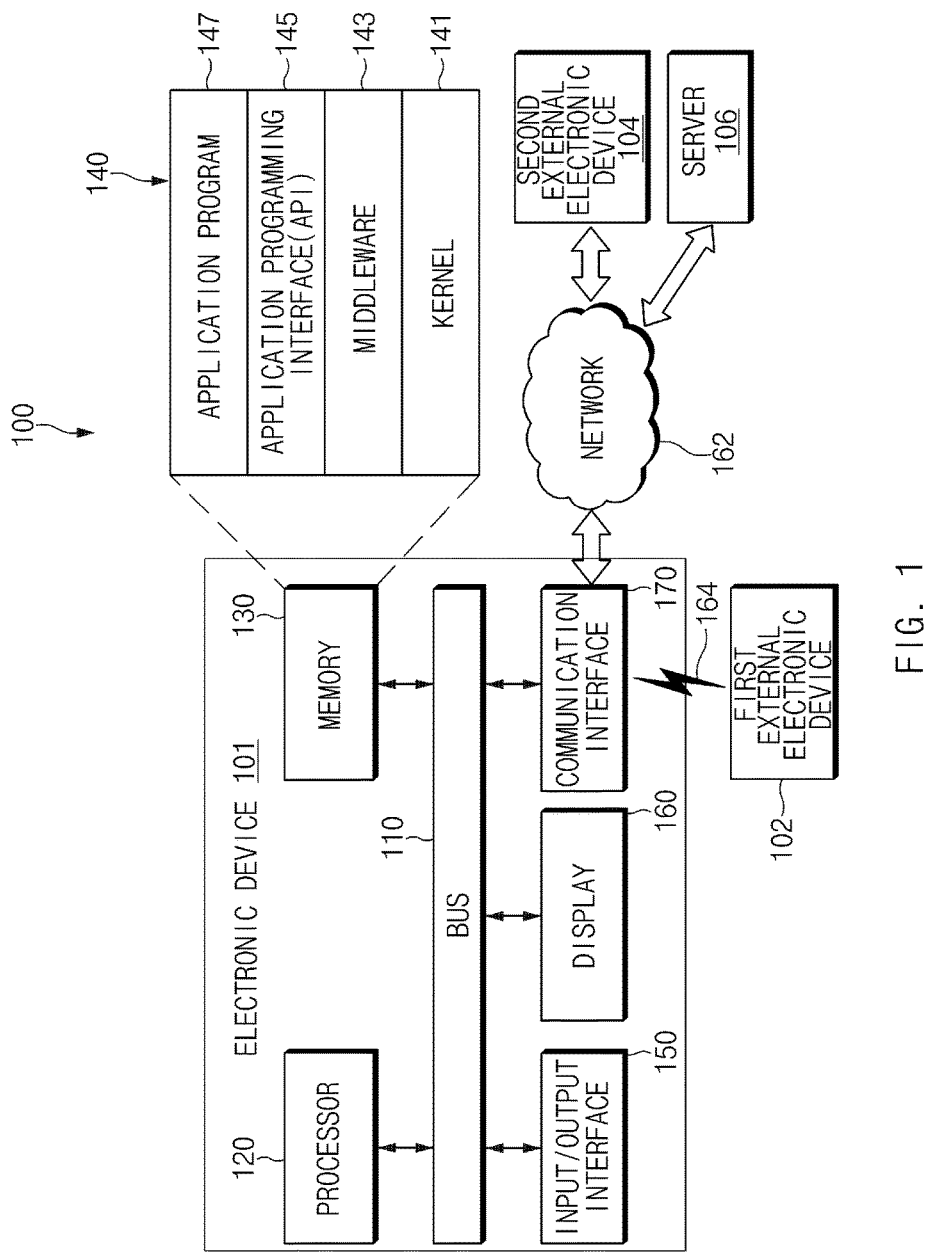
FIG. 1 a block diagram illustrating an example network environment, according to various example embodiments of the present disclosure.

Various example embodiments of the present disclosure may be described with reference to accompanying drawings. Accordingly, those of ordinary skill in the art will recognize that modifications, equivalents, and/or alternatives of the various embodiments described herein can be variously made without departing from the scope and spirit of the present disclosure. With regard to description of drawings, similar elements may be marked by similar reference numerals.

In the disclosure disclosed herein, the expressions "have", "may have", "include" and "comprise", or "may include" and "may comprise" used herein indicate existence of corresponding features (e.g., elements such as numeric values, functions, operations, or components) but do not exclude presence of additional features.

In the disclosure disclosed herein, the expressions "A or B", "at least one of A or/and B", or "one or more of A or/and B", and the like used herein may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The terms, such as "first", "second", and the like used herein may refer to various elements of various embodiments, but do not limit the elements. Furthermore, such terms may be used to distinguish one element from another element. For example, "a first user device" and "a second user device" may indicate different user devices regardless of the order or priority thereof. For example, "a first user device" and "a second user device" indicate different user devices.

It will be understood that when an element (e.g., a first element) is referred to as being "(operatively or communicatively) coupled with/to" or "connected to" another element (e.g., a second element), it may be directly coupled with/to or connected to the other element or an intervening element (e.g., a third element) may be present. On the other hand, when an element (e.g., a first element) is referred to as being "directly coupled with/to" or "directly connected to" another element (e.g., a second element), it should be understood that there are no intervening element (e.g., a third element).

According to the situation, the expression "configured to" used herein may be used interchangeably with, for example, the expression "suitable for", "having the capacity to", "designed to", "adapted to", "made to", or "capable of". The term "configured to" must not refer only to "specifically designed to" in hardware. Instead, the expression "a device configured to" may refer to a situation in which the device is "capable of" operating together with another device or other components. For example, a "processor configured to perform A, B, and C" may refer, for example, to a dedicated processor (e.g., an embedded processor) for performing a corresponding operation or a generic-purpose processor (e.g., a central processing unit (CPU) or an application processor) which may perform corresponding operations by executing one or more software programs which are stored in a memory device.

Terms used in the present disclosure are used to describe specified embodiments and are not intended to limit the scope of the present disclosure. The terms of a singular form may include plural forms unless otherwise specified. Unless otherwise defined herein, all the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal manner unless expressly so defined herein in various embodiments of the present disclosure. In some cases, even if terms are terms which are defined in the disclosure, they may not be interpreted to exclude embodiments of the present disclosure.

An electronic device according to various example embodiments of the present disclosure may include at least one of smartphones, tablet personal computers (PCs), mobile phones, video telephones, e-book readers, desktop PCs, laptop PCs, netbook computers, workstations, servers, personal digital assistants (PDAs), portable multimedia players (PMPs), Motion Picture Experts Group (MPEG-1 or MPEG-2) Audio Layer 3 (MP3) players, mobile medical devices, cameras, wearable devices (e.g., head-mounted-devices (HMDs), such as electronic glasses), an electronic apparel, electronic bracelets, electronic necklaces, electronic appcessories, electronic tattoos, smart watches, or the like, but is not limited thereto.

According to another example embodiment, the electronic devices may be home appliances. The home appliances may include at least one of, for example, televisions (TVs), digital versatile disc (DVD) players, audios, refrigerators, air conditioners, cleaners, ovens, microwave ovens, washing machines, air cleaners, set-top boxes, home automation control panels, security control panels, TV boxes (e.g., Samsung HomeSync™, Apple TV™, or Google TV™), game consoles (e.g., Xbox™ or PlayStation™), electronic dictionaries, electronic keys, camcorders, electronic picture frames, or the like, but is not limited thereto.

According to another example embodiment, the electronic device may include at least one of medical devices (e.g., various portable medical measurement devices (e.g., a blood glucose monitoring device, a heartbeat measuring device, a blood pressure measuring device, a body temperature measuring device, and the like)), a magnetic resonance angiography (MRA), a magnetic resonance imaging (MRI), a computed tomography (CT), scanners, and ultrasonic devices), navigation devices, global positioning system (GPS) receivers, event data recorders (EDRs), flight data recorders (FDRs), vehicle infotainment devices, electronic equipment for vessels (e.g., navigation systems and gyrocompasses), avionics, security devices, head units for vehicles, industrial or home robots, automatic teller's machines (ATMs), points of sales (POSs), or internet of things (e.g., light bulbs, various sensors, electric or gas meters, sprinkler devices, fire alarms, thermostats, street lamps, toasters, exercise equipment, hot water tanks, heaters, boilers, and the like), or the like, but is not limited thereto.

According to another example embodiment, the electronic devices may include at least one of parts of furniture or buildings/structures, electronic boards, electronic signature receiving devices, projectors, or various measuring instruments (e.g., water meters, electricity meters, gas meters, or wave meters, and the like), or the like, but is not limited thereto. In the various embodiments, the electronic device may be one of the above-described various devices or a combination thereof. An electronic device according to an embodiment may be a flexible device. Furthermore, an electronic device according to an embodiment may not be limited to the above-described electronic devices and may include other electronic devices and new electronic devices according to the development of technologies.

Hereinafter, an electronic device according to the various embodiments may be described with reference to the accompanying drawings. The term "user" used herein may refer to a person who uses an electronic device or may refer to a device (e.g., an artificial intelligence electronic device) that uses an electronic device.

Referring to FIG. 1, according to various example embodiments, there is illustrated an example electronic device 101 in a network environment 100. The electronic device 101 may include a bus 110, a processor (e.g., including processing circuitry) 120, a memory 130, an input/output interface (e.g., including input/output interface circuitry) 150, a display 160, and a communication interface (e.g., including communication circuitry) 170. According to an example embodiment, the electronic device 101 may not include at least one of the above-described components or may further include other components.

The bus 110 may be, for example, a circuit which connects the components 120 to 170 with each other and transmits a communication signal (e.g., a control message and/or data) between the components.

The processor 120 may include various processing circuitry, such as, for example, and without limitation, one or more of a dedicated processor, a central processing unit (CPU), an application processor (AP), or a communication processor (CP). For example, the processor 120 may perform calculation or data processing about control and/or communication of at least another of the components of the electronic device 101.

The memory 130 may include a volatile and/or non-volatile memory. The memory 130 may store, for example, a command or data associated with at least another of the components of the electronic device 101. According to an embodiment, the memory 130 may store software and/or a program 140. The program 140 may include, for example, a kernel 141, a middleware 143, an application programming interface (API) 145, and/or an least one application program 147 (or "at least one application"), and the like. At least part of the kernel 141, the middleware 143, or the API 145 may be referred to as an operating system (OS).

The kernel 141 may control or manage, for example, system resources (e.g., the bus 110, the processor 120, or the memory 130, and the like) used to execute an operation or function implemented in the other programs (e.g., the middleware 143, the API 145, or the application program 147). Also, as the middleware 143, the API 145, or the application program 147 accesses a separate component of the electronic device 101, the kernel 141 may provide an interface which may control or manage system resources.

The middleware 143 may play a role as, for example, a go-between such that the API 145 or the application program 147 communicates with the kernel 141 to communicate data.

Also, the middleware 143 may process one or more work requests, received from the application program 147, in order of priority. For example, the middleware 143 may assign priority which may use system resources (the bus 110, the processor 120, or the memory 130, and the like) of the electronic device 101 to at least one of the at least one application program 147. For example, the middleware 143 may perform scheduling or load balancing for the one or more work requests by processing the one or more work requests in order of the priority assigned to the at least one of the at least one application program 147.

The API 145 may be, for example, an interface in which the application program 147 controls a function provided from the kernel 141 or the middleware 143. For example, the API 145 may include at least one interface or function (e.g., a command) for file control, window control, image processing, or text control, and the like.

The input/output interface 150 may include various input/output circuitry and play a role as, for example, an interface which may transmit a command or data input from a user or another external device to another component (or other components) of the electronic device 101. Also, input/output interface 150 may output an instruction or data received from another component (or other components) of the electronic device 101 to the user or the other external device.

The display 160 may include, for example, a liquid crystal display (LCD), a light emitting diode (LED) display, an organic LED (OLED) display, a microelectromechanical systems (MEMS) display, or an electronic paper display, or the like, but is not limited thereto. The display 160 may display, for example, a variety of content (e.g., text, images, videos, icons, or symbols, and the like) to the user. The display 160 may include a touch screen, and may receive, for example, touch, gesture, proximity, or a hovering input using an electronic pen or part of a body of the user.

The communication interface 170 may include various communication circuitry and establish communication between, for example, the electronic device 101 and an external device (e.g., a first external electronic device 102, a second external electronic device 104, or a server 106). For example, the communication interface 170 may connect to a network 162 through wireless communication or wired communication and may communicate with the external device (e.g., the second external electronic device 104 or the server 106). Additionally, the communication interface 170 may establish a short-range communication connection 164 with an external electronic device (e.g., a first external electronic device 102).

The wireless communication may use, for example, at least one of long term evolution (LTE), LTE-advanced (LTE-A), code division multiple access (CDMA), wideband CDMA (WCDMA), universal mobile telecommunications system (UMTS), wireless broadband (WiBro), or global system for mobile communications (GSM), and the like as a cellular communication protocol. Also, the wireless communication may include, for example, a short-range wireless local-area communication 164. The local-area communication 164 may include, for example, at least one of wireless-fidelity (Wi-Fi) communication, Bluetooth (BT) communication, near field communication (NFC), or global navigation satellite system (GNSS) communication, and the like.

An MST module may generate a pulse based on transmission data using an electromagnetic signal and may generate a magnetic field signal based on the pulse. The electronic device 101 may output the magnetic field signal to a point of sales (POS) system. The POS system may restore the data by detecting the magnetic field signal using an MST reader and converting the detected magnetic field signal into an electric signal.

The GNSS may include, for example, at least one of a global positioning system (GPS), a Glonass, a Beidou navigation satellite system (hereinafter referred to as "Beidou"), or a Galileo (i.e., the European global satellite-based navigation system) according to an available area or a bandwidth, and the like. Hereinafter, the "GPS" used herein may be interchangeably with the "GNSS". The wired communication may include at least one of, for example, universal serial bus (USB) communication, high definition multimedia interface (HDMI) communication, recommended standard 232 (RS-232) communication, or plain old telephone service (POTS) communication, and the like. The network 162 may include a telecommunications network, for example, at least one of a computer network (e.g., a local area network (LAN) or a wide area network (WAN)), the Internet, or a telephone network.

Each of the first and second external electronic devices 102 and 104 may be the same as or different device from the electronic device 101. According to an embodiment, the server 106 may include a group of one or more servers. According to various embodiments, all or some of operations executed in the electronic device 101 may be executed in another electronic device or a plurality of electronic devices (e.g., the first external electronic device 102, the second external electronic device 104, or the server 106). According to an embodiment, if the electronic device 101 should perform any function or service automatically or according to a request, it may request another device (e.g., the first external electronic device 102, the second external electronic device 104, or the server 106) to perform at least part of the function or service, rather than executing the function or service for itself or in addition to the function or service. The other electronic device (e.g., the first external electronic device 102, the second external electronic device 104, or the server 106) may execute the requested function or the added function and may transmit the executed result to the electronic device 101. The electronic device 101 may process the received result without change or additionally and may provide the requested function or service. For this purpose, for example, cloud computing technologies, distributed computing technologies, or client-server computing technologies may be used.

Figure 2:
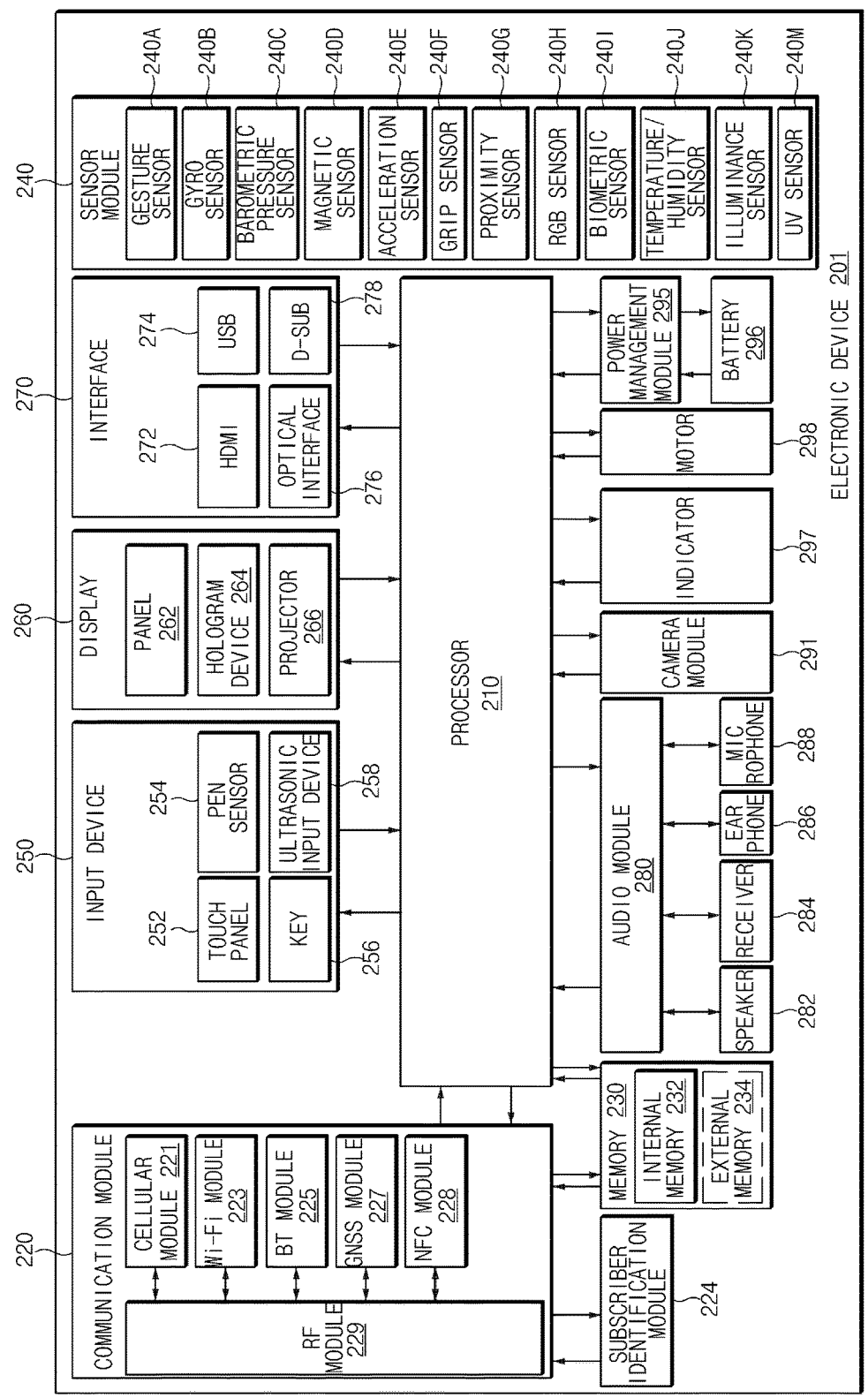
FIG. 2 is a block diagram illustrating an example electronic device, according to various example embodiments of the present disclosure.

FIG. 2 is a block diagram illustrating an example electronic device 201, according to various example embodiments. An electronic device 201 may include, for example, all or part of the electronic device 101 illustrated in FIG. 1. The electronic device 201 may include one or more processors (e.g., an application processor (AP))(e.g., including processing circuitry) 210, a communication module (e.g., including communication circuitry) 220, a subscriber identification module 224, a memory 230, a sensor module 240, an input device (e.g., including input circuitry) 250, a display 260, an interface (e.g., including interface circuitry) 270, an audio module 280, a camera module 291, a power management module 295, a battery 296, an indicator 297, and a motor 298.

The processor 210 may include various processing circuitry and drive, for example, an operating system (OS) or an application program to control a plurality of hardware or software components connected thereto and may process and compute a variety of data. The processor 210 may be implemented with, for example, a system on chip (SoC). According to an embodiment, the processor 210 may include a graphic processing unit (GPU) (not shown) and/or an image signal processor (not shown). The processor 210 may include at least some (e.g., a cellular module 221) of the components shown in FIG. 2. The processor 210 may load a command or data received from at least one of other components (e.g., a non-volatile memory) into a volatile memory to process the data and may store various data in a non-volatile memory.

The communication module 220 may have the same or similar configuration to a communication interface 1370 of FIG. 1. The communication module 220 may include various communication circuitry, such as, for example, and without limitation, the cellular module 221, a wireless-fidelity (Wi-Fi) module 223, a Bluetooth (BT) module 225, a global navigation satellite system (GNSS) module 227 (e.g., a GPS module, a Glonass module, a Beidou module, or a Galileo module), a near field communication (NFC) module 228, and a radio frequency (RF) module 229.

The cellular module 221 may provide, for example, a voice call service, a video call service, a text message service, or an Internet service, and the like through a communication network. According to an embodiment, the cellular module 221 may identify and authenticate the electronic device 201 in a communication network using the SIM 224 (e.g., a SIM card). According to an embodiment, the cellular module 221 may perform at least part of functions which may be provided by the processor 210. According to an embodiment, the cellular module 221 may include a communication processor (CP).

The Wi-Fi module 223, the BT module 225, the GNSS module 227, or the NFC module 228 may include, for example, a processor for processing data transmitted and received through the corresponding module. According to various embodiments, at least some (e.g., two or more) of the cellular module 221, the Wi-Fi module 223, the BT module 225, the GNSS module 227, or the NFC module 228 may be included in one integrated chip (IC) or one IC package.

The RF module 229 may transmit and receive, for example, a communication signal (e.g., an RF signal). Though not shown, the RF module 229 may include, for example, a transceiver, a power amplifier module (PAM), a frequency filter, or a low noise amplifier (LNA), or an antenna, and the like. According to another embodiment, at least one of the cellular module 221, the Wi-Fi module 223, the BT module 225, the GNSS module 227, or the NFC module 228 may transmit and receive an RF signal through a separate RF module.

The SIM 224 may include, for example, a card which includes a SIM and/or an embedded SIM. The SIM 224 may include unique identification information (e.g., an integrated circuit card identifier (ICCID)) or subscriber information (e.g., an international mobile subscriber identity (IMSI)).

The memory 230 (e.g., a memory 130 of FIG. 1) may include, for example, an embedded memory 232 and/or an external memory 234. The embedded memory 232 may include at least one of, for example, a volatile memory (e.g., a dynamic random access memory (DRAM), a static RAM (SRAM), a synchronous dynamic RAM (SDRAM), and the like), or a non-volatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash memory or a NOR flash memory, and the like), a hard drive, or a solid state drive (SSD)).

The external memory 234 may include a flash drive, for example, a compact flash (CF), a secure digital (SD), a micro-SD, a mini-SD, an extreme digital (xD), a multimedia car (MMC), or a memory stick, and the like. The external memory 234 may operatively and/or physically connect with the electronic device 201 through various interfaces.

The sensor module 240 may measure, for example, a physical quantity or may detect an operation state of the electronic device 201, and may convert the measured or detected information to an electrical signal. The sensor module 240 may include at least one of, for example, a gesture sensor 240A, a gyro sensor 240B, a barometer (e.g., barometric pressure) sensor 240C, a magnetic sensor 240D, an acceleration sensor 240E, a grip sensor 240F, a proximity sensor 240G, a color sensor 240H (e.g., red, green, blue (RGB) sensor), a biometric sensor 240I, a temperature/humidity sensor 240J, an illumination (e.g., illuminance) sensor 240K, or an ultraviolet (UV) sensor 240M. Additionally or alternatively, the sensor module 240 may further include, for example, an e-nose sensor (not shown), an electromyography (EMG) sensor (not shown), an electroencephalogram (EEG) sensor (not shown), an electrocardiogram (ECG) sensor (not shown), an infrared (IR) sensor (not shown), an iris sensor (not shown), and/or a fingerprint sensor (not shown), and the like. The sensor module 240 may further include a control circuit for controlling at least one or more sensors included therein. According to various embodiments, the electronic device 201 may further include a processor configured to control the sensor module 240, as part of the processor 210 or to be independent of the processor 210. While the processor 210 is in a sleep state, the electronic device 201 may control the sensor module 240.

The input device 250 may include various input circuitry, such as, for example, and without limitation, a touch panel 252, a (digital) pen sensor 254, a key 256, or an ultrasonic input device 258. The touch panel 252 may use at least one of, for example, a capacitive type, a resistive type, an infrared type, or an ultrasonic type. Also, the touch panel 252 may further include a control circuit. The touch panel 252 may further include a tactile layer and may provide a tactile reaction to a user.

The (digital) pen sensor 254 may be, for example, part of the touch panel 252 or may include a separate sheet for recognition. The key 256 may include, for example, a physical button, an optical key, or a keypad. The ultrasonic input device 258 may allow the electronic device 201 to detect a sound wave using a microphone (e.g., a microphone 288) and to verify data through an input tool generating an ultrasonic signal.

The display 260 (e.g., a display 160 of FIG. 1) may include a panel 262, a hologram device 264, or a projector 266. The panel 262 may include the same or similar configuration to the display 160 or 160. The panel 262 may be implemented to be, for example, flexible, transparent, or wearable. The panel 262 and the touch panel 252 may be integrated into one module. The hologram device 264 may show a stereoscopic image in a space using interference of light. The projector 266 may project light onto a screen to display an image. The screen may be positioned, for example, inside or outside the electronic device 201. According to an embodiment, the display 260 may further include a control circuit for controlling the panel 262, the hologram device 264, or the projector 266.

The interface 270 may include various interface circuitry, such as, for example, and without limitation, a high-definition multimedia interface (HDMI) 272, a universal serial bus (USB) 274, an optical interface 276, or a D-subminiature 278. The interface 270 may be included in, for example, a communication interface 170 shown in FIG. 1. Additionally or alternatively, the interface 270 may include, for example, a mobile high definition link (MI-IL) interface, an SD card/multimedia card (MMC) interface, or an infrared data association (IrDA) standard interface.

The audio module 280 may convert a sound and an electric signal in dual directions. At least part of components of the audio module 280 may be included in, for example, an input and output interface 150 (or a user interface) shown in FIG. 1. The audio module 280 may process sound information input or output through, for example, a speaker 282, a receiver 284, an earphone 286, or the microphone 288, and the like.

The camera module 291 may be a device which captures a still image and a moving image. According to an embodiment, the camera module 291 may include one or more image sensors (not shown) (e.g., a front sensor or a rear sensor), a lens (not shown), an image signal processor (ISP) (not shown), or a flash (not shown) (e.g., an LED or a xenon lamp).

The power management module 295 may manage, for example, power of the electronic device 201. According to an embodiment, though not shown, the power management module 295 may include a power management integrated circuit (PMIC), a charger IC or a battery or fuel gauge. The PMIC may have a wired charging method and/or a wireless charging method. The wireless charging method may include, for example, a magnetic resonance method, a magnetic induction method, or an electromagnetic method, and the like. An additional circuit for wireless charging, for example, a coil loop, a resonance circuit, or a rectifier, and the like may be further provided. The battery gauge may measure, for example, the remaining capacity of the battery 296 and voltage, current, or temperature thereof while the battery 296 is charged. The battery 296 may include, for example, a rechargeable battery or a solar battery.

The indicator 297 may display a specific state of the electronic device 201 or part (e.g., the processor 210) thereof, for example, a booting state, a message state, or a charging state, and the like. The motor 298 may convert an electric signal into mechanical vibration and may generate vibration or a haptic effect, and the like. Though not shown, the electronic device 201 may include a processing unit (e.g., a GPU) for supporting a mobile TV. The processing unit for supporting the mobile TV may process media data according to standards, for example, a digital multimedia broadcasting (DMB) standard, a digital video broadcasting (DVB) standard, or a mediaFlo™ standard, and the like.

Each of the above-mentioned elements of the electronic device according to various embodiments of the present disclosure may be configured with one or more components, and names of the corresponding elements may be changed according to the type of the electronic device. The electronic device according to various embodiments of the present disclosure may include at least one of the above-mentioned elements, some elements may be omitted from the electronic device, or other additional elements may be further included in the electronic device. Also, some of the elements of the electronic device according to various embodiments of the present disclosure may be combined with each other to form one entity, thereby making it possible to perform the functions of the corresponding elements in the same manner as before the combination.

Hereinafter, the interface 270, for example, the first and second electronic devices 101 and 201 respectively connected to external connectors (or plugs) in a USB 3.1 type, and a method of controlling the interface 270 according thereto will be described. The electronic device 201 supporting an USB interface described in various example embodiments of the present disclosure may employ a USB 3.1, and an external connector (or a plug) of a C type that is a contact form inserted in various directions may be described. However, various embodiments of the present disclosure may not be limited thereto.

Figure 3:
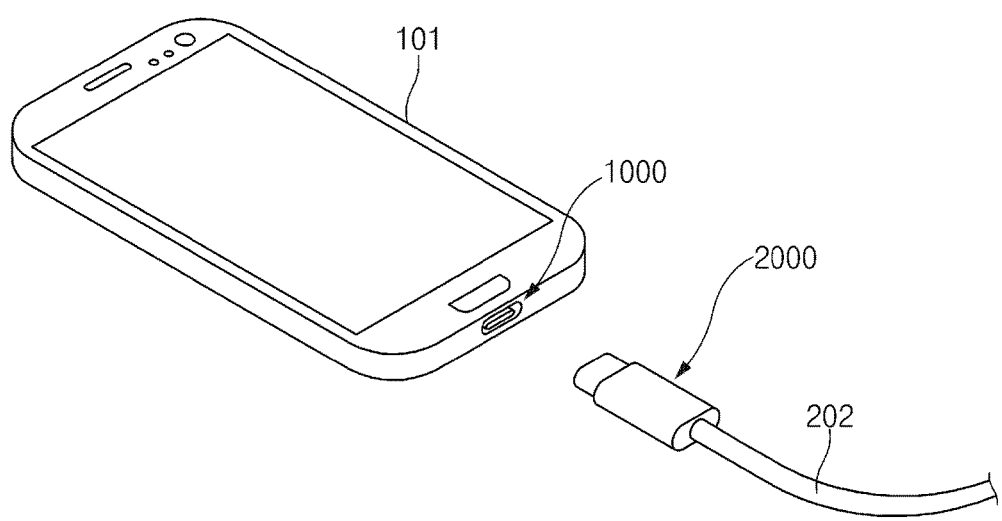
FIG. 3 is a diagram including a perspective view of an example electronic device supporting a USB interface, according to various example embodiments of the present disclosure.

FIG. 3 is a perspective view illustrating an example electronic device supporting a USB interface, according to various example embodiments of the present disclosure.

Referring to FIG. 3, according to various embodiments of the present disclosure, a receptacle 1000 may be connected to the electronic device 101, and the external connector 2000 may be connected to an external device (not illustrated). In this case, the electronic device 101 connected to the receptacle 1000 may be, for example, a terminal, and the external connector 2000 may be connected to another external device via a cable 202. The external connector 2000 may be disposed to inserted in the receptacle 1000 to connect the electronic device 101 connected with the receptacle 1000 and the external connector 2000.

Figure 4A:
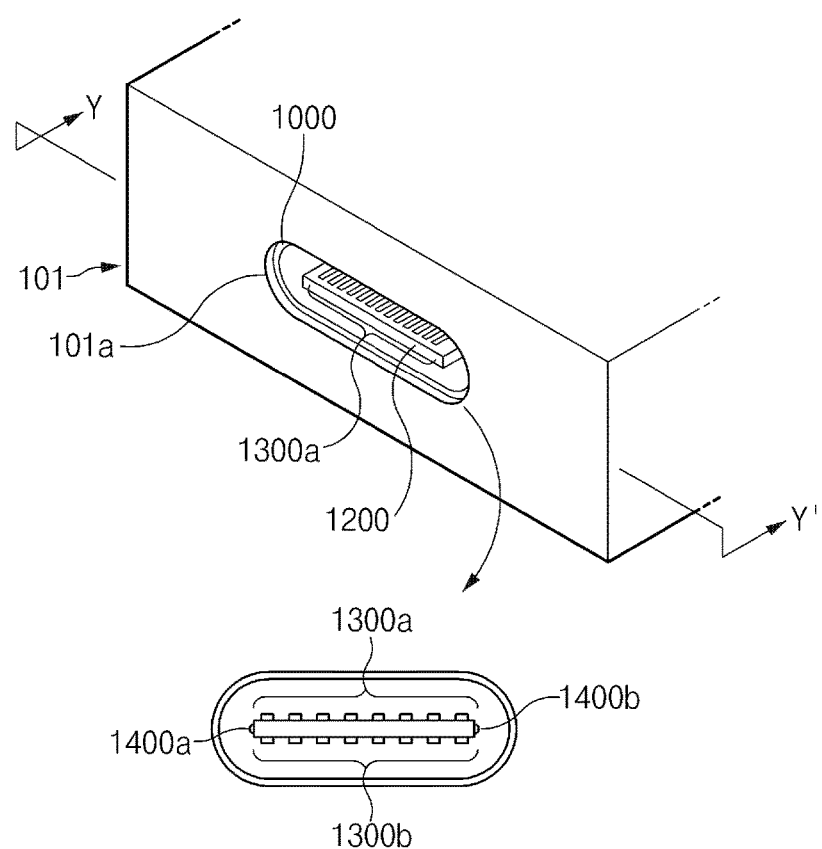
FIG. 4A is a front and perspective view of a receptacle, according to various example embodiments of the present disclosure.
Figure 4B:
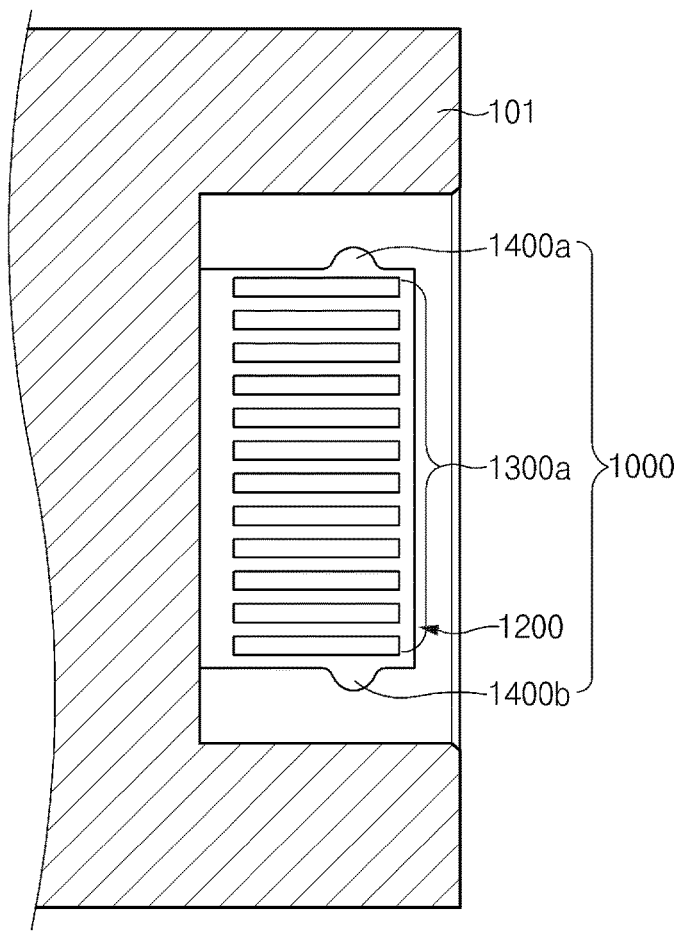
FIG. 4B is a cross-sectional view taken along Y-Y' line across the receptacle illustrated in FIG. 4A.

FIGS. 4A and 4B are diagrams illustrating an example receptacle, according to various example embodiments of the present disclosure. FIG. 4A is a front perspective view of the receptacle, and FIG. 4B is a cross-sectional view taken along Y-Y' line across the receptacle illustrated in FIG. 4A.

In FIGS. 4A and 4B, a recess 101a may be formed in a part of a housing of the electronic device 101. The receptacle 1000 may be formed, for example, on the inner surface of the recess 101a. A contact seating part 1200, a plurality of conductive receptacle contacts 1300a and 1300b (or pins, contacts, contact units, and the like) disposed in a plurality of recesses (not illustrated) formed in the contact seating part 1200, and first connecting parts 1400a and 1400b provided on opposite side surfaces of the contact seating part 1200 may be included in the receptacle 1000.

The contact seating part 1200 may include a plurality of recesses in which the plurality of contacts 1300a and 1300b are disposed. According to an example embodiment, the contact seating part 1200 may include a first surface and a second surface that are disposed to face each other, and the plurality of recesses may be provided on the first surface and the second surface of the contact seating part 1200. According to an embodiment, in this case, the number of recesses may be twelve. However, various embodiments of the present disclosure may not be limited thereto. The number of recesses may be formed depending on the number of contacts 1300a and 1300b seated thereon. According to various embodiments, all contacts may be disposed in the plurality of recesses or may be disposed in only some of the plurality of recesses. According to various embodiments, the number of contacts may be determined depending on the use of the receptacle 1000. For example, if a cable including the receptacle 1000 is only for data communication, it is not necessary to place the pins in all of the plurality of recesses, and pins may be disposed only in the corresponding recesses.

According to various embodiments, the plurality of contacts 1300a and 1300b may have elasticity and may be disposed such that a part of the plurality of contacts 1300a and 1300b protrudes outwardly from the plurality of recesses. As such, when a contact seating part of the external connector 2000 side is inserted into the recess 101a, the plurality of contacts 1300a and 1300b may be attached to contacts of an external connector.

The first connecting parts 1400a and 1400b may, for example, be a connection device for tightly inserting the receptacle 1000 into the external connector 2000. According to an embodiment, the first connecting parts 1400a and 1400b may be disposed on opposite side surfaces of the contact seating part 1200, and a part of the first connecting parts 1400a and 1400b may be disposed to protrude on opposite sides of the contact seating part 1200 such that the part of the first connecting parts 1400a and 1400b contacts a part of the external connector 2000. However, various embodiments of the present disclosure may not be limited thereto. The first connecting parts 1400a and 1400b may be disposed in one of one side surface or an upper portion and a lower portion of the contact seating part 1200 such that the first connecting parts 1400a and 1400b contact a part of the external connector 2000. Accordingly, the receptacle 1000 may be connected with the external connector 2000.

Figure 5A:
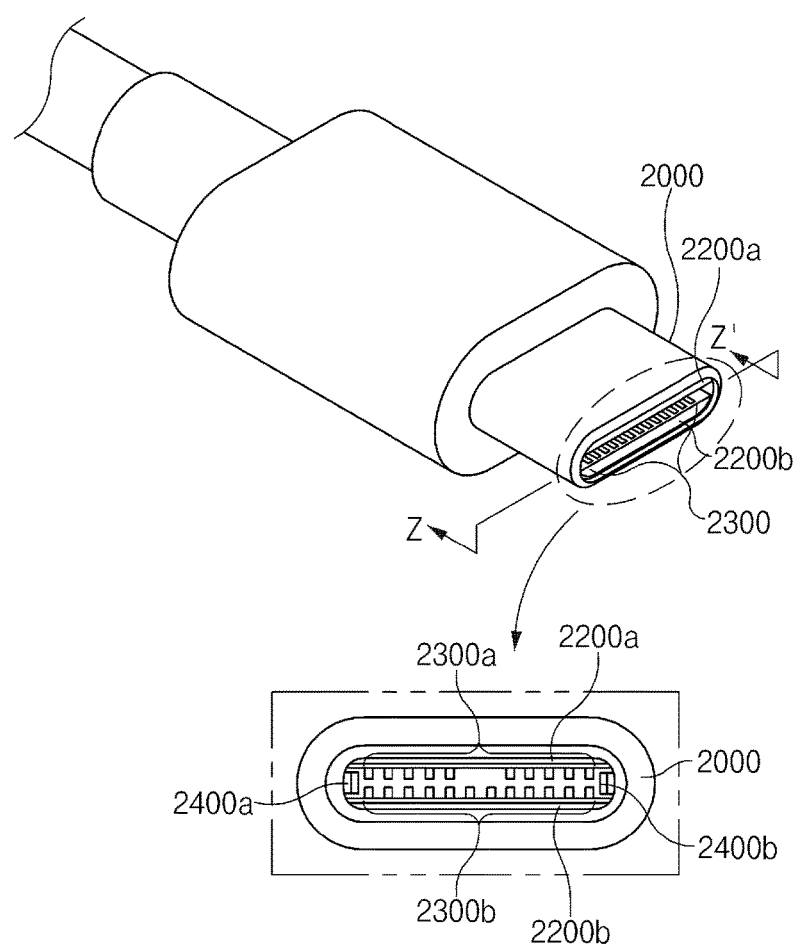
FIG. 5A is a front and perspective view of an external connector, according to various example embodiments of the present disclosure.
Figure 5B:
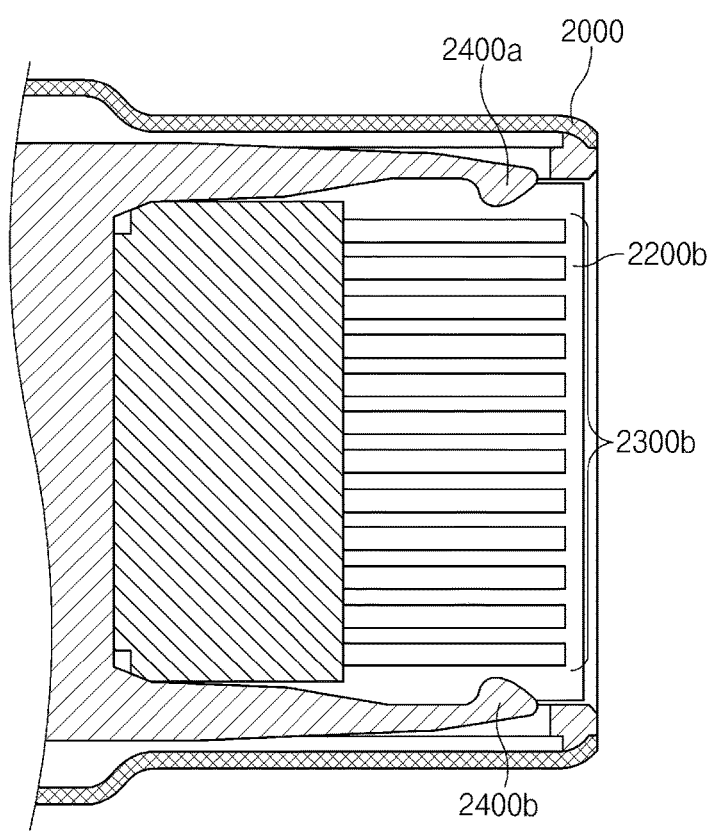
FIG. 5B is a cross-sectional view taken along Z-Z' line across an external connector illustrated in FIG. 5A.

FIGS. 5A and 5B are diagrams illustrating an example external connector, according to various example embodiments of the present disclosure. FIG. 5A is a perspective view of the external connector and FIG. 5B is a cross-sectional view taken along Z-Z' line across the external connector illustrated in FIG. 5A.

Referring to FIGS. 5A and 5B, according to various example embodiments of the present disclosure, the external connector 2000 may include contact seating parts 2200a and 2200b and a plurality of external conductive contacts 2300a and 2300b disposed in a plurality of recesses (not illustrated) formed in the contact seating parts 2200a and 2200b.

In the above-described elements, the external connector 2000 may be inserted toward the inside of the receptacle 1000. According to various embodiments, second connecting parts 2400a and 2400b to be inserted into the first connecting parts 1400a and 1400b of the receptacle 1000 may be disposed on opposite side surfaces of the contact seating parts 2200a and 2200b. According to an embodiment, the second connecting parts 2400a and 2400b may be implemented with a latch structure into which the first connecting parts 1400a and 1400b are to be inserted. However, an embodiment of the present disclosure may not be limited thereto.

When the second connecting parts 2400a and 2400b and the first connecting parts 1400a and 1400b are connected with each other, the external connector 2000 may maintain connection to the receptacle 1000.

The contact seating parts 2200a and 2200b may form a plurality of recesses in which the plurality of contacts 2300a and 2300b are disposed, and all the plurality of contacts 2300a and 2300b may be disposed in the plurality of recesses or some of the plurality of contacts 2300a and 2300b may be disposed in the plurality of recesses.

According to various embodiments, when the external connector 2000 is inserted into the inside of the receptacle 1000, the plurality of external contacts 2300a and 2300b of the external connector 2000 may be connected to correspond to the plurality of contacts 1300a and 1300b of the receptacle 1000.

In a USB 3.1 type according to an embodiment, an external device connected by the receptacle 1000 and the external connector 2000 may operate as a USB host or a USB device.

Figure 6A:
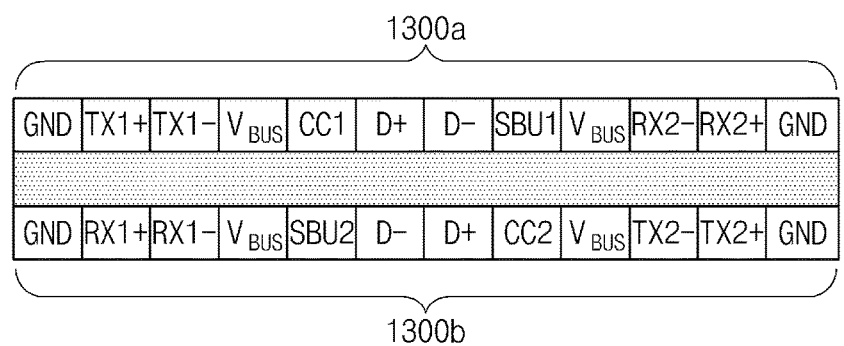
FIGS. 6A and 6B are diagrams illustrating example functions of receptacle contacts and external connector contacts, according to various example embodiments of the present disclosure.
Figure 6B:
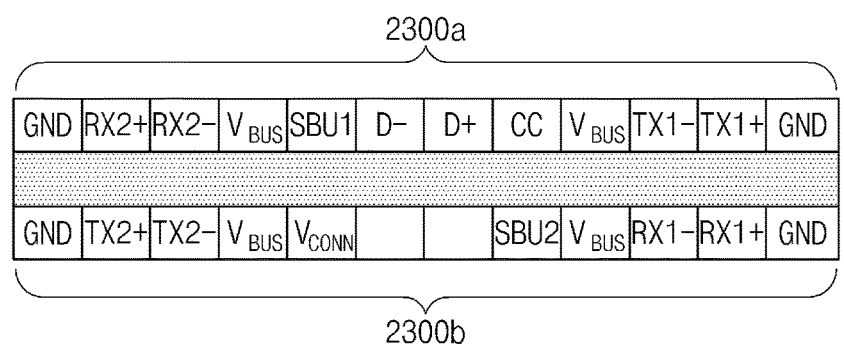

Tables describing a function of a contact according to various example embodiments of the present disclosure illustrated in FIGS. 6A and 6B. According to an embodiment, a plurality of contacts of the receptacle 1000 may include the first contacts 1300a disposed on a first surface of the contact seating part 1200 and the second contacts 1300b disposed on a second surface of the contact seating part 1200. As described above, the first and second contacts 1300a and 1300b may be disposed in a plurality of recesses included in the contact seating part 1200 such that the first and second contacts 1300a and 1300b are mirrored with respect to the center of the contact seating part 1200.

According to various embodiments, in the case where a plurality of contacts includes the first and second contacts 1300a and 1300b disposed on a first surface and a second surface of the contact seating part 1200, a plurality of external contacts of the external connector 2000 may include the first external contacts 2300a and the second external contacts 2300b such that the plurality of external contacts of the external connector 2000 are disposed to face each other in the first and second contact seating part 2200a and 2200b, and the first and second external contacts 2300a and 2300b may correspond to the first and second contacts 1300a and 1300b, respectively.

As shown in Table 1, according to various embodiments of the present disclosure, each of the number of the first and second contacts 1300a and 1300b and the number of the first and second external contacts 2300a and 2300b may be twelve, and all or part of the first and second contacts 1300a and 1300b and the first and second external contacts 2300a and 2300b may be disposed in the above-described receptacle 1000 and the external connector 2000. In Table 1 below, Pin No. indicates the location of a pin in the external connector 2000 (or a plug).

TABLE 1

| PIN No. | Signal Name | Description |
|---|---|---|
| 1 | GND | Ground |
| 2 | TX+ | Super speed TX positive |
| 3 | TX− | Super speed TX negative |
| 4 | $V_{Bus}$ | USB cable power |
| 5 | CC | Identification contact (USB_ID) |
| 6 | D+ | +line of the differential bi-directional USB signal |
| 7 | D− | −line of the differential bi-directional USB signal |
| 8 | SBU | Side Band Use; additional purpose pin (e.g., an audio signal, a display signal, or the like) |
| 9 | $V_{Bus}$ | USB cable power |
| 10 | RX− | Super speed RX negative |
| 11 | RX+ | Super speed RX positive |
| 12 | GND | Ground |

As described above, according to various embodiments of the present disclosure, each of the receptacle 1000 and the external connector 2000 employing the USB 3.1 manner may support at least one of a USB host and USB device.

According to an embodiment, the electronic device supporting the USB interface may define the insertion direction of the external connector 2000 connected to the receptacle 1000 and whether an external device connected to the receptacle 1000 and the external connector 2000 operates as a USB device or as a USB host, by measuring a voltage of an identification contact USB_ID (a CC contact as the fifth contact).

As such, to recognize the insertion direction of the external connector 2000 and to define whether the external device connected to the receptacle 1000 and the external connector 2000 is the USB device or the USB host by measuring the voltage of the CC contact, a specified current may be always applied to the CC contact. In this case, in the case where there is a foreign object (e.g., moisture) at the CC contact exposed to the outside, the CC contact may be electrolytically corroded due to moisture.

Figure 7:
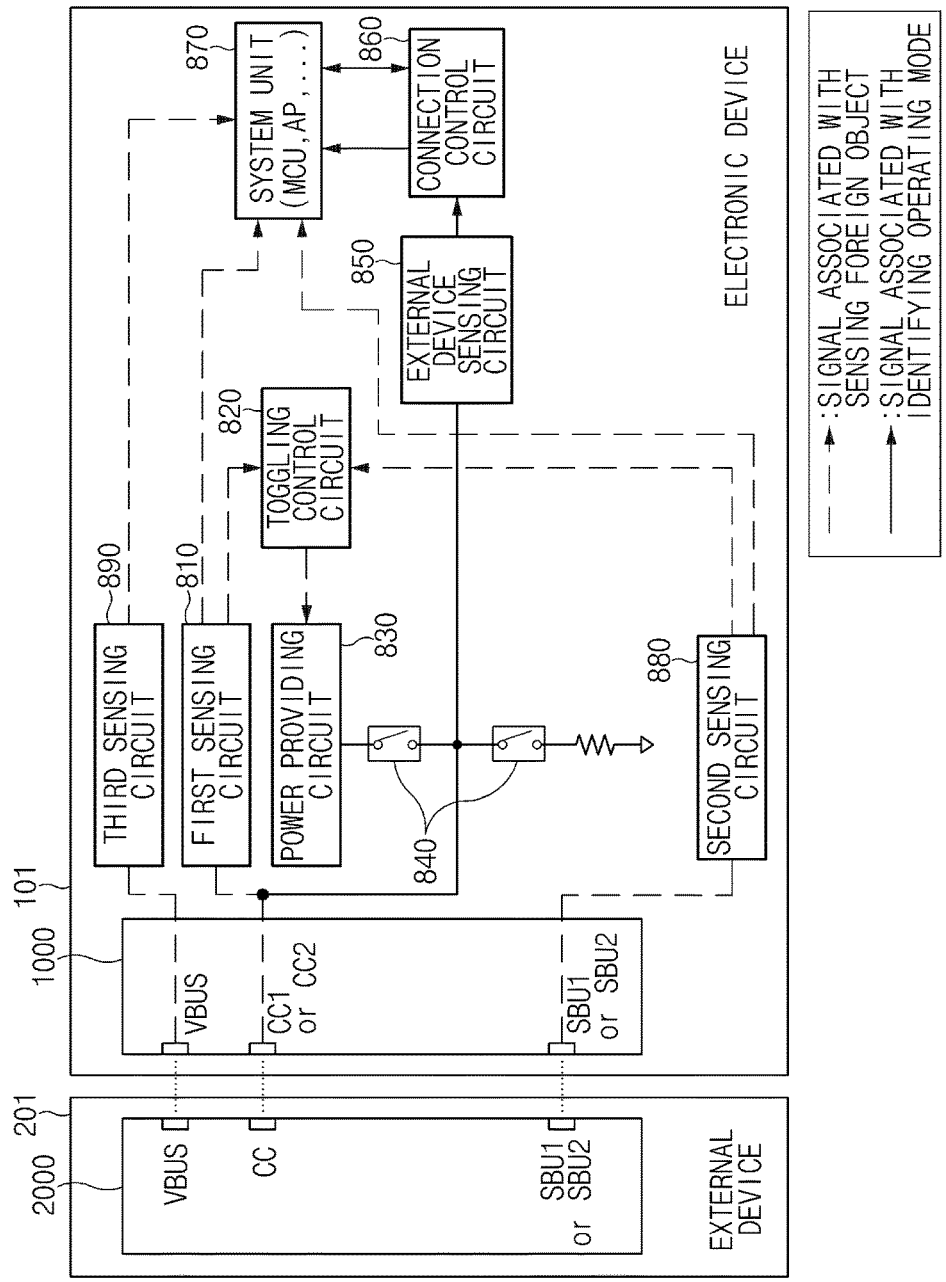
FIG. 7 is a circuit diagram illustrating an example electronic device controlling a USB interface, according to various example embodiments of the present disclosure.

FIG. 7 is a circuit diagram illustrating an example electronic device controlling a USB interface, according to various example embodiments of the present disclosure.

In FIG. 7, the control circuit of the electronic device 101 may include a first sensing circuit 810, a toggling control circuit 820, a power providing circuit 830, a switching device (e.g., including switching circuitry) 840, an external device sensing circuit 850, a connection control circuit 860, and a system unit (e.g., including processing circuitry) 870.

According to various embodiments of the present disclosure, at least part of the first sensing circuit 810, the toggling control circuit 820, the power providing circuit 830, the switching device 840, the external device sensing circuit 850 and the connection control circuit 860 may be an identification circuit that identifies the operating modes of the electronic device 101 and the external device 201 and may be implemented with one an integrated circuit (IC) or a field-programmable gate array (FPGA).

In FIG. 7, according to various embodiments of the present disclosure, a dotted line indicates the transmission of a signal for selectively toggling a CC1 contact or a CC2 contact depending on whether a foreign object (or foreign material) is present in a receptacle contact, and a solid line indicates the transmission of a signal for identifying an operating mode of the electronic device 101 according to toggling of the CC1 contact or the CC2 contact.

According to an embodiment, the electronic device 101 may identify the operating mode of the electronic device 101 based at least partly on information of detected (or sensed) existence of the foreign object flowing in the identification contact is present.

The first sensing circuit 810 may be a circuit that is configured to detect (or determine, or sense) whether the foreign object contacting the CC1 contact or the CC2 contact is present, based on at least one of a voltage, a current, and impedance detected at the CC1 contact or the CC2 contact.

According to various embodiments of the present disclosure, for convenience of description, the first sensing circuit 810 electrically connected to one of the CC1 contact or the CC2 contact is illustrated. However, a plurality of first sensing circuits 810 may be electrically connected to respectively correspond to the CC1 contact and the CC2 contact, depending on implementation of an embodiment.

The first sensing circuit 810 may control the toggling control circuit 820 that activates the switching device 840 for selectively toggling the CC1 contact or the CC2 contact, depending on whether the foreign object is present at the CC1 contact or the CC2 contact.

For example, the first sensing circuit 810 may detect at least one of the voltage, the current, and the impedance applied to the CC1 contact or the CC2 contact.

If it is determined that the foreign object is not present at the CC1 contact or the CC2 contact, the first sensing circuit 810 may transmit a control signal to the toggling control circuit 820. On the other hand, if it is determined that the foreign object is present at the CC1 contact or the CC2 contact, the first sensing circuit 810 may transmit the control signal (e.g., an interrupt request signal (IRQ)) for providing notification of whether the foreign object is present, to the connection control circuit 860 or the system unit 870. To that end, a separate general purpose input output (GPIO) for receiving the control signal from the first sensing circuit 810 may be provided in the connection control circuit 860 or the system unit 870.

According to various embodiments of the present disclosure, the first sensing circuit 810 may be implemented to include a comparator. The configuration of the first sensing circuit 810 including the comparator will be described in greater detail below with reference to FIG. 8.

According to various embodiments of the present disclosure, the toggling control circuit 820 may include a circuit that is configured to control the switching device 840 based at least partly on information of detected (or sensed) the existence of the foreign object detected (or sensed, or obtained) by the first sensing circuit 810 is present.

According to various embodiments of the present disclosure, for example, at least part of information sensing the existence of the foreign object (or information detecting the existence of the foreign object) may be determined based on the control signal, which is received from the first sensing circuit 810, determined according to whether the foreign object is present.

The controlling, by the toggling control circuit 820, of the switching device 840 may include selectively applying a current to the CC1 contact or the CC2 contact by controlling, by the toggling control circuit 820, the power providing circuit 830 such that the switching device 840 is activated.

According to various embodiments of the present disclosure, in the case where the control signal is a signal indicating that there is no foreign object at the CC1 contact or the CC2 contact, the toggling control circuit 820 may control the power providing circuit 830 to apply a current to the switching device 840 and the CC1 contact or the CC2 contact.

According to various embodiments of the present disclosure, the control signal may be a signal indicating that the foreign object is present at the CC1 contact or the CC2 contact. In this case, the toggling control circuit 820 may stop applying of a current flowing into the switching device 840, and the CC1 contact or the CC2 contact by controlling the power providing circuit 830.

When the external connector 2000 is inserted into the receptacle 1000, the power providing circuit 830 may be a circuit that applies a current, of which the level is not less than a specific level, to the CC1 contact or the CC2 contact.

The specific level or more may, for example, be a value between about 80 uA to about 330 uA. For example, according to the USB type C standard, a current to be applied in a default USB state may be about 80 uA, a current to be applied in 1.5 A@5 V state may be about 180 uA, and a current to be applied in 3.0 A@5 V state may be about 330 uA.

The switching device 840 may be a circuit that is configured to electrically connect the power providing circuit 830 with the CC1 contact or the CC2 contact or to disconnect the CC1 contact or the CC2 contact from the power providing circuit 830. The switching device 840 may be implemented inside the above-described identification circuit, or may be a physical switch and may be provided independently of an identification circuit.

In the case where the current is applied from the power providing circuit 830 to the switching device 840 and the CC1 contact or the CC2 contact, a voltage of a specific range may be applied to one contact of the CC1 contact and the CC2 contact by the switching device 840, and the other contact may remain in an open state.

In other words, the voltage of at least one contact of the CC1 contact and the CC2 contact may be periodically toggled between a pull-up state H and a pull-down state L by the switching device 840.

Figure 8:
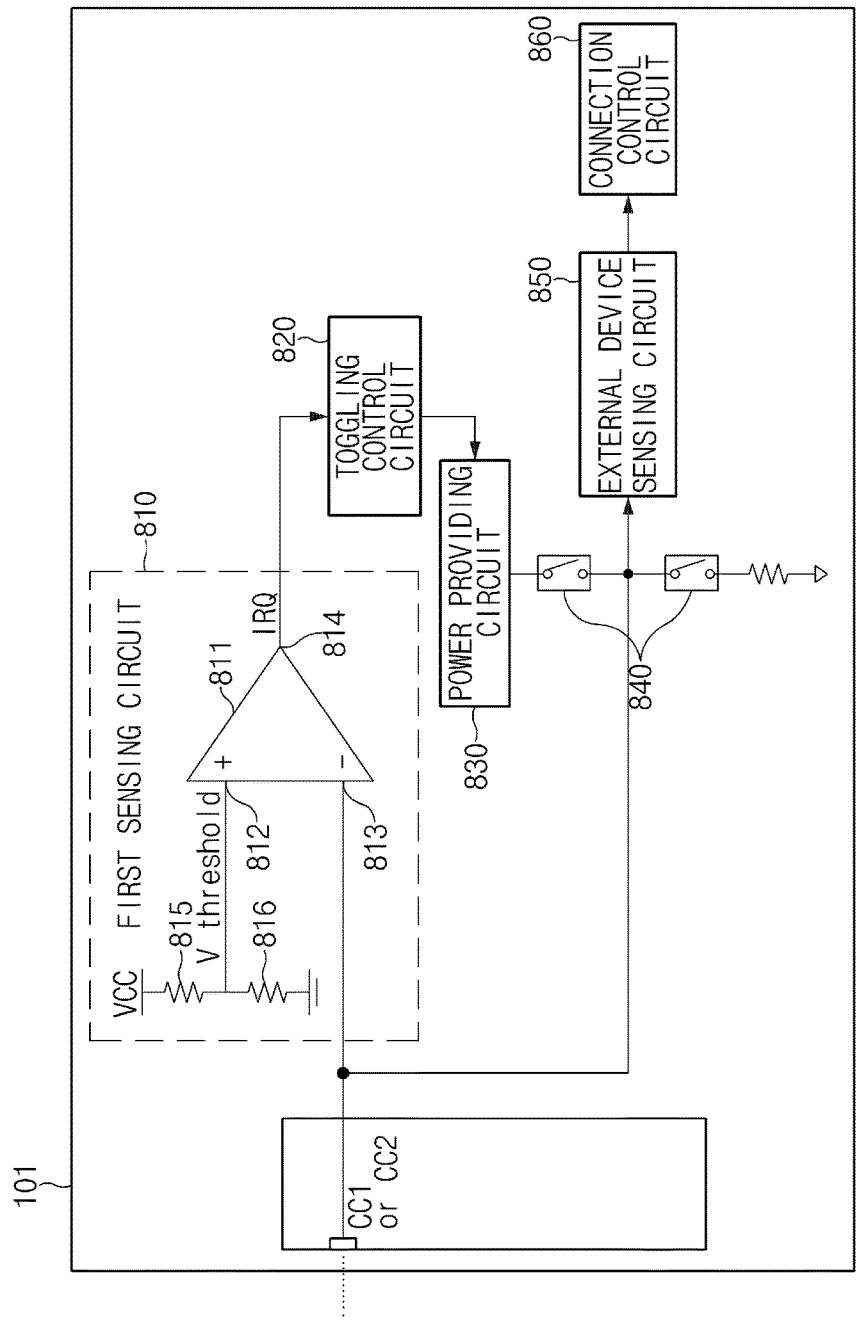
FIG. 8 is block diagram illustrating an example sensing circuit including a comparator, according to various example embodiments of the present disclosure.

When the voltage of each of the CC1 contact and the CC2 contact is toggled, the external device sensing circuit 850 may detect at least one of a voltage, a current, and impedance, which are applied to the CC1 contact and the CC2 contact. In this case, the external device sensing circuit 850 including a comparator may be implemented as illustrated in FIG. 8.

The external device sensing circuit 850 may transmit a control signal according to the detected result to the connection control circuit 860.

The connection control circuit 860 may identify the operating mode of the electronic device 101 depending on the voltage, which is detected by the external device sensing circuit 850 and which is applied to the CC1 contact and the CC2 contact.

For example, each of the electronic device 101 and the external device 102 may be classified into a host (e.g., a downstream facing port (DFP)) and a device (e.g., an upstream facing port (UFP)) depending on the voltage applied to the CC1 contact and the CC2 contact and may operate as the host or the device.

For example, an electronic device connected with a pull-up (H) circuit (e.g., a pull-up resistor) during a specific time period or more may be defined as the host, and an electronic device connected with a pull-down (H) circuit (e.g., a pull-down resistor) may be defined as the device. In this case, when the device (UFP) needs power, the host DFP may supply power via a power supply contact (e.g., VBUS or VCONN).

According to various embodiments, the electronic device 101 and the external device 102 may operate as a dual role port (DRP) in addition to the host and the device. The DRP may indicate a mode (function) in which the role of the host or device of an electronic device is capable of being adaptively changed. For example, the DRP operating as the host may be changed into the device, and the DRP operating as the device may be changed into the host. Alternatively, one DRP may operate as the host, and the other DRP may operate as the device. For example, the electronic device such as a smartphone, a PC, or the like may operate as a host or a device.

The system unit 870 may include various processing circuitry, such as, for example, and without limitation, an application processor (AP), a central processing unit (CPU), or a micro controller unit (MCU) of the electronic device 101. The system unit 870 may receive information about operating modes of the electronic device 101 and the external device 102 from the connection control circuit 860. This signal may be, for example, a form of an IRQ and may be received from the connection control circuit 860.

The system unit 870 may perform a following operation according to the operating modes of the electronic device 101 and the external device 102. For example, the system unit 870 may transmit additional data associated with an operating mode, may perform authentication of the external device 102, or may perform a communication process according to a USB power delivery (PD) standard. At least part of the operation may be performed by the connection control circuit 860.

According to various embodiments of the present disclosure, even though the first sensing circuit 810 is included therein, there may be a situation where it is difficult to detect a foreign object existing in the CC1 contact or the CC2 contact. According to various embodiments, since the number of contacts of a USB 3.1 Type-C connector (a plug or a receptacle) is relatively greater than the number of contacts of a conventional USB type (e.g., USB 2.0) and a number of contacts are disposed to face each other, there may be a need to detect foreign objects of other contacts in addition to the CC1 contact or the CC2 contact.

For example, in the case where an external connector in which the foreign object is present is inserted into a receptacle connected with the electronic device 101 in a state where a USB PD IC of the external device 201 is powered off, the impedance of the foreign object may be cancelled out by the impedance of a cable. That is, in the case where the impedance of the cable and the impedance of the foreign object are connected in parallel, a pull-down impedance having a impedance value of a range in which the first sensing circuit 810 recognizes the external device 201 as a normal device may be detected at the CC1 contact or the CC2 contact.

To that end, a second sensing circuit 880 may be further provided in the electronic device 101 of FIG. 7.

The second sensing circuit 880 may control the toggling control circuit 820 based on at least one of a voltage, a current, and impedance that are detected at other receptacle contacts (e.g., a SBU1 or SBU2 contact, a D+ or D− contact, a TX1 or TX2 contact, a RX1 or RX2 contact, or the like) as well as the identification contact CC1 or CC2 contact. According to various embodiments, the second sensing circuit 880 may prevent and/or reduce the contacts from being electrolytically corroded by cutting off the power flowing into the contacts.

According to various embodiments of the present disclosure, for convenience of description, the second sensing circuit 880 electrically connected to one of the SBU1 contact or the SBU2 contact is illustrated. However, a plurality of second sensing circuits 880 may be electrically connected to respectively correspond to the SBU1 contact and the SBU2 contact, depending on implementation of an embodiment.

According to various embodiments of the present disclosure, the second sensing circuit 880 may be electrically connected with at least one of above-described other receptacle contacts (e.g., the D+ or D− contact, the TX1 or TX2 contact, the RX1 or RX2 contact, or the like).

In FIG. 7, the second sensing circuit 880 may detect at least one of a voltage, a current, and impedance that are applied to the SBU1 contact or SBU2 contact.

If the detected result indicates that the foreign object is not present at the SBU1 contact or the SBU2 contact, the second sensing circuit 880 may transmit a control signal to the toggling control circuit 820. On the other hand, if it is determined that the foreign object is present at the SBU1 contact or the SBU2 contact, the second sensing circuit 880 may transmit the control signal (e.g., an interrupt request signal) for providing notification of whether the foreign object is present, to the connection control circuit 860 or the system unit 870. Alternatively, the second sensing circuit 880 may prevent and/or reduce electrolytic corrosion capable of occurring at the SBU1 contact or the SBU2 contact by cutting off the power flowing into the SBU1 contact or the SBU2 contact.

To that end, the second sensing circuit 880 may be implemented to include a comparator. The configuration of the second sensing circuit 880 including the comparator will be described in detail with reference to FIG. 8.

Meanwhile, even though the voltage, the current, or the impedance that is detected at the above-described receptacle contacts (e.g., CC1 and CC2, SBU1 and SBU2, D+ and D−, TX1 and TX2, RX1 and RX2) is not within a normal range, a situation where a current supplied from the external device 201 is not be controlled may occur.

For example, in the case where Standard A to Type C in which power negotiation is impossible is used as a cable defined in the USB TYPE-C standard, a host (e.g., a notebook computer or the like) supplying power may continuously provide a current through the VBUS contact.

To that end, a third sensing circuit 890 may be further provided in the electronic device 101 of FIG. 7.

The third sensing circuit 890 may detect at least one of the voltage, the current, and the impedance applied to the VBUS contact.

If the detected result indicates that a voltage is applied to the VBUS contact, the third sensing circuit 890 may transmit a control signal (e.g., an interrupt request signal) to the system unit 870.

The system unit 870 may change the operation of the electronic device 101 based on information about the existence of a foreign object, which is received from by the first sensing circuit 810 and the second sensing circuit 880, and the control signal received from the third sensing circuit 890.

In this case, at least part of information of detected (or sensed) the existence of the foreign object may be a control signal for providing notification of the existence of the foreign object by determining, by the first sensing circuit 810 and the second sensing circuit 880, that the foreign object is present at a receptacle contact.

If a voltage is applied to the VBUS contact in a state where a foreign object is present at the above-described receptacle contacts (e.g., CC1 and CC2 contacts, SBU1 and SBU2 contacts, D+ and D− contacts, TX1 and TX2 contacts, RX1 and RX2 contacts, and the like), the system unit 870 may change the operation of the electronic device 101.

For example, the system unit 870 may block the inflow of a current through the VBUS contact by providing the control data to the external device 201 through the D+ and D− contact. Alternatively, the system unit 870 may change the state of the electronic device 101 into a sleep mode state or may turn off the power of the electronic device 101 by blocking the power supplied from the battery 296. Alternatively, the system unit 870 may turn off the power of the connection control circuit 860 or the external device sensing circuit 850. The system unit 870 may control the connection control circuit 860 such that all receptacle contacts are in a pull-up state.

Alternatively, the system unit 870 may provide a notification message to a display device (e.g., the display 160 of FIG. 1 or the display 260 of FIG. 2). The display device may be exposed through a part of a housing of the electronic device 101. As such, the notification message (e.g., a pop-up message) may be provided to a user through the display device.

The notification message may be provided through execution of an application. For example, in the case where the system unit 870 is an AP, the AP may call instructions for execution of an application stored in a memory (e.g., the memory 130 of FIG. 1 or the memory 230 of FIG. 2) and may control the display device such that the notification message is displayed depending on an arithmetic operation that is based on the called instructions.

To that end, a notification may be provided through a display device based at least partly on sensing the existence of the foreign object, and/or instructions for changing the operation of the electronic device 101 may be stored in a memory in advance.

Meanwhile, in the case where the electronic device 101 supports a Try.SNK or Try.SRC mode in which the electronic device 101 operates only during a given time period, the electronic device 101 may further include a configuration that is capable of changing an operation period or a toggling period at which the CC1 contact or the CC2 contact operates in the Try.SNK or Try.SRC mode, based on an inflow frequency or an inflow history of the foreign object recognized by the first sensing circuit 810.

FIG. 8 is block diagram illustrating an example sensing circuit including a comparator, according to various example embodiments of the present disclosure.

In FIG. 8, for convenience of description, the first sensing circuit 810 of FIG. 8 is exemplified as a sensing circuit including a comparator 811. However, it is apparent to apply a sensing circuit including the comparator 811 to the second sensing circuit 880 or the third sensing circuit 890. For example, in FIG. 8, a contact to which the sensing circuit is connected may be connected with the above-described other receptacle contacts (e.g., SBU1 contact or SBU2 contact, VBUS contact, and the like) as well as a CC1 contact or a CC2 contact.

In FIG. 8, a non-inverted input 812 of the comparator 811 included in the first sensing circuit 810 may be connected with a threshold voltage circuit applying a threshold voltage for whether the foreign object is present. The threshold voltage circuit may be comprised of divided resistors 815 and 816 and a power providing circuit VCC. In this case, the power providing circuit VCC may be a power feeding circuit the same as the power providing circuit 830 connected with the switching device 840.

An inverted input 813 may be connected with the CC1 contact or the CC2 contact and a voltage applied to the CC1 contact or the CC2 contact may be input to the inverted input 813.

An output 814 may be connected with the toggling control circuit 820, and the control signal according to the comparison result may be transmitted from the output 814 to the toggling control circuit 820.

For example, in the case where the voltage applied to the CC1 contact or the CC2 contact is detected to be not less than a predefined threshold voltage or to be not greater than the predefined threshold voltage, the control signal according to whether a foreign object is present may be transmitted to the toggling control circuit 820.

In this case, a reference about whether the reference for determining whether the foreign object is present is not less than a threshold voltage or whether the reference for determining whether the foreign object is present is not greater than the threshold voltage may be determined depending on a manner in which a circuit is connected with each of the non-inverted input 812 and the inverted input 813 of the comparator 811.

According to various embodiments of the present disclosure, in the case where the threshold voltage circuit is connected to the non-inverted input 812 and the CC1 contact or the CC2 contact is connected to the inverted input 813, if the voltage applied to the CC1 contact or the CC2 contact is not less than the predefined threshold voltage, the control signal may be transmitted to the toggling control circuit 820.

According to various embodiments of the present disclosure, in the case where the threshold voltage circuit is connected to the inverted input 813 and the CC1 contact or the CC2 contact is connected to the non-inverted input 812, if the voltage applied to the CC1 contact or the CC2 contact is not greater than the predefined threshold voltage, the control signal may be transmitted to the toggling control circuit 820.

If the voltage of the CC1 contact or the CC2 contact is toggled under control of the toggling control circuit 820, the operating mode of the electronic device 101 may be designated based on a voltage detected at the CC1 contact or the CC2 contact.

Accordingly, since the operations of the toggling control circuit 820, the power providing circuit 830, the switching device 840, the external device sensing circuit 850, and the connection control circuit 860 correspond to the operations of the toggling control circuit 820, the power providing circuit 830, a switching device 840, the external device sensing circuit 850, and the connection control circuit 860 of FIG. 8, the description thereof is not repeated here.

FIGS. 9A, 9B, 9C and 10 are circuit diagrams illustrating an example electronic device supporting a USB interface, according to various example embodiments of the present disclosure.

Figure 9A:
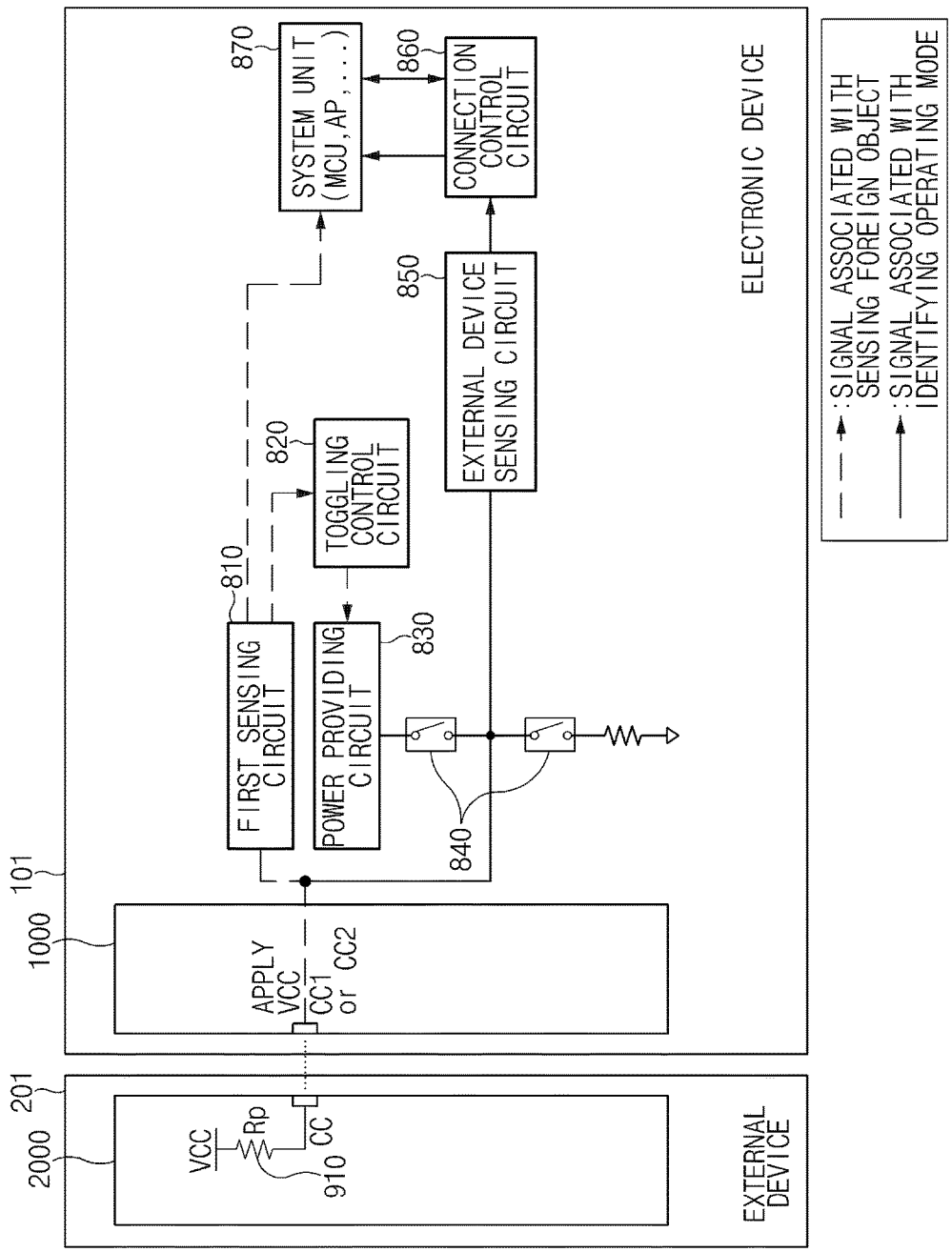
FIGS. 9A, 9B, 9C, 10, 11A and 11B are circuit diagrams illustrating an example electronic device controlling a USB interface, according to various example embodiments of the present disclosure.
Figure 9B:
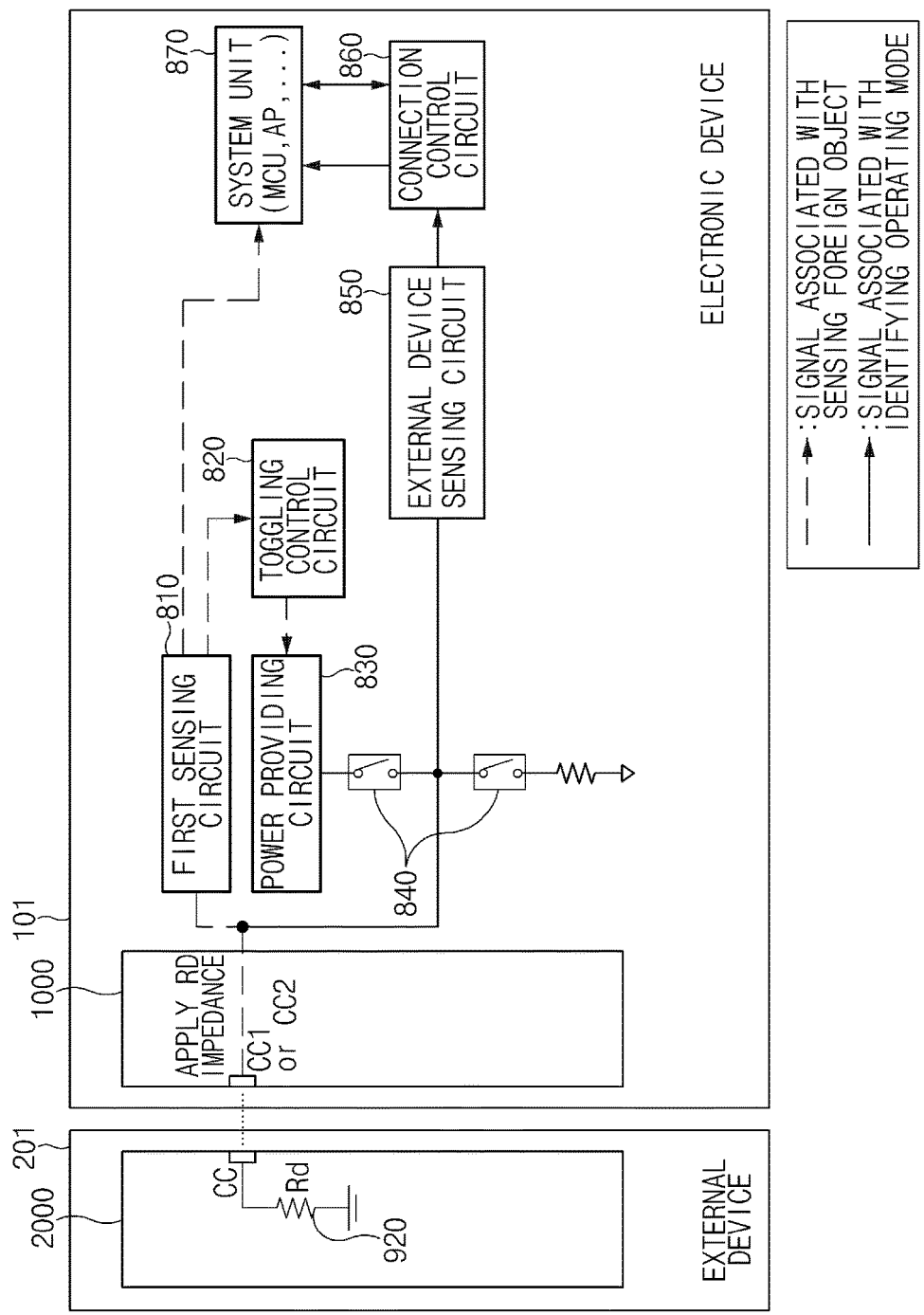
Figure 9C:
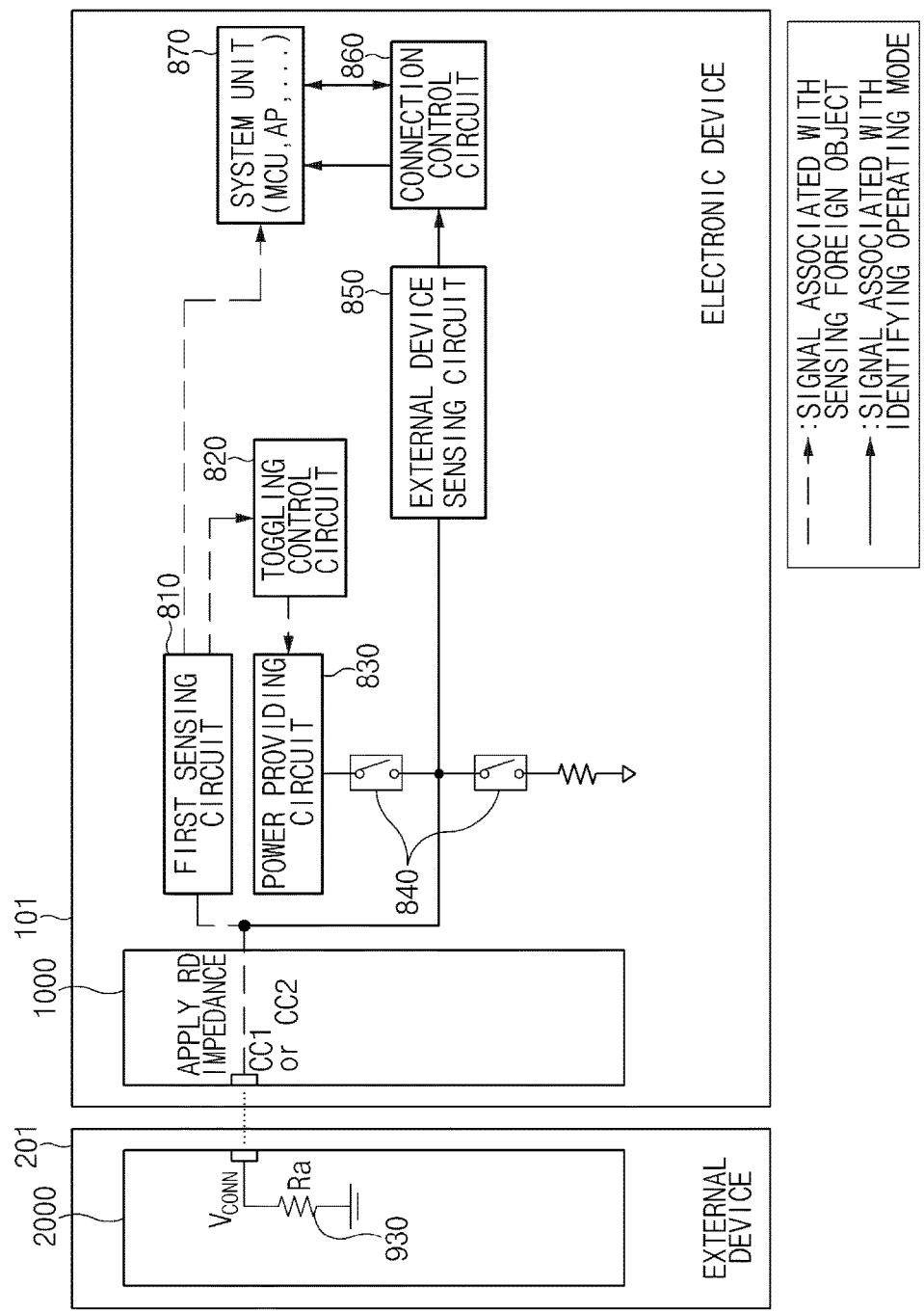
Figure 10:
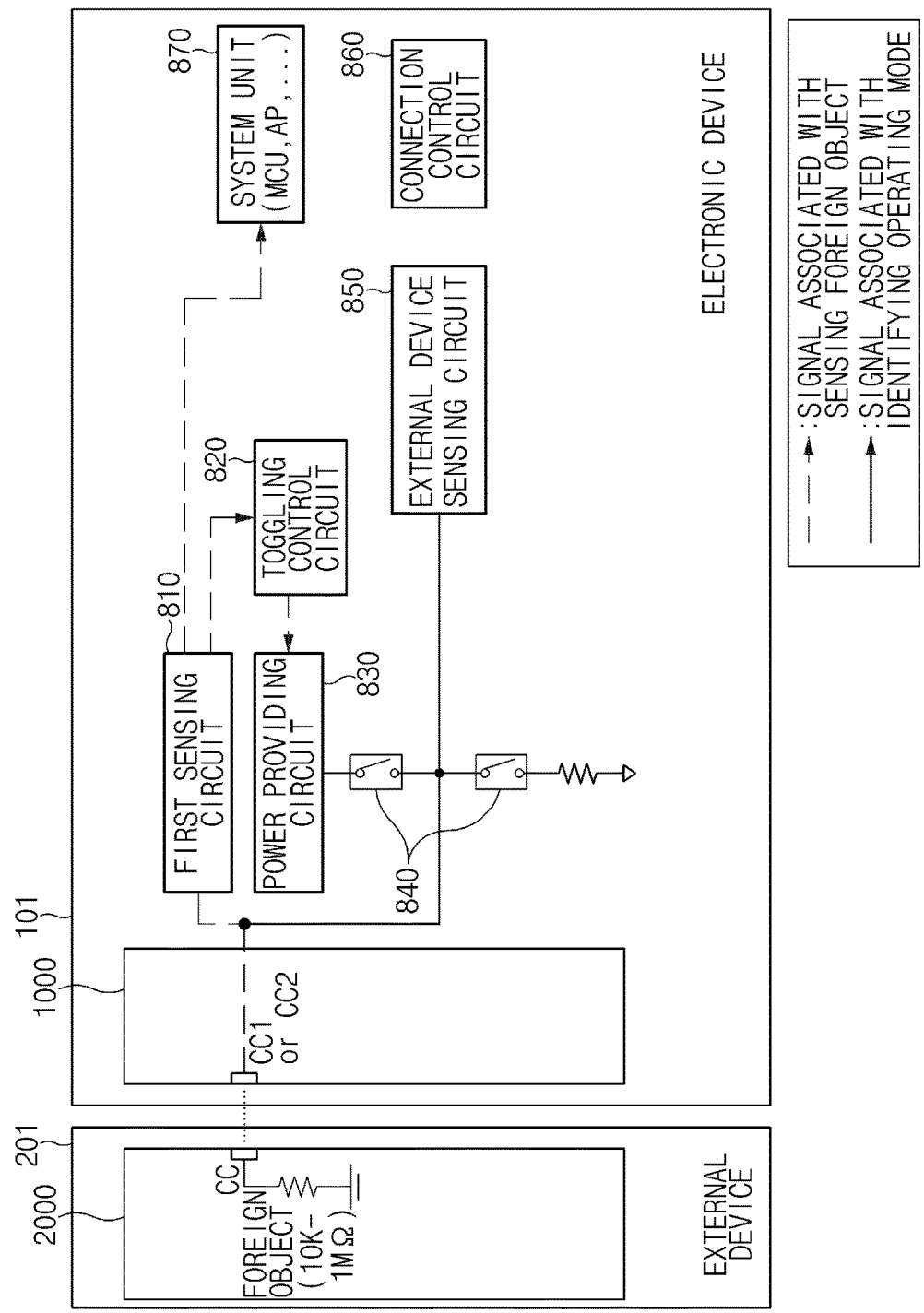

FIGS. 9A, 98B and 9C are control circuits of the electronic device 101 according to various example embodiments of the present disclosure in the case where there is no foreign object at a CC1 contact or a CC2 contact. FIG. 10 is a control circuit of the electronic device 101 according to an example embodiment of the present disclosure in the case where the foreign object is present at the CC1 contact or the CC2 contact.

FIGS. 9A and 10 are diagrams that disclose the operating mode of the electronic device 101 according to sensing whether the foreign object is present at the CC1 contact or the CC2 contact by the first sensing circuit 810. It is apparent that the second sensing circuit 880 operates in the operating mode of the electronic device 101 according to sensing whether a foreign object is present at receptacle contacts (e.g., SBU1 and SBU2, D+ and D−, TX1 and TX2, and RX1 and RX2) different from a configuration of FIGS. 9a and 10.

According to an embodiment, in FIG. 9A, in the case where a pull-up resistor Rp 910 is connected to the CC contact of the external device 201, a VCC voltage according to the pull-up resistor Rp 910 may be applied to the CC1 contact or the CC2 contact.

If it is determined that there is no foreign object at the CC1 contact or the CC2 contact, based on the applied voltage, the first sensing circuit 810 may transmit a control signal to the toggling control circuit 820.

If the voltage of each of the CC1 contact and the CC2 contact is toggled under control of the toggling control circuit 820, the operating modes of the electronic device 101 and the external device 201 may be designated based on the voltage detected at the CC1 contact and the CC2 contact.

According to various embodiments of the present disclosure, in the case where the VCC voltage is applied to the CC1 contact or the CC2 contact, the external device 201 may operate as a power source supplying power, and the electronic device 101 may operate as a power sink receiving the power. A situation where the external device 201, for example, a wall charger operates as the power source may be a situation where the external device 201 operates as the host of a DRP or a device connected to an external connector of 'Standard-A' defined in a USB TYPE-C standard.

According to another embodiment, in FIG. 9B, in the case where a pull-down resistor Rd 920 is connected to a CC contact of the external device 201, a Rd impedance according to the pull-down resistor Rd 920 of the external device 201 may be applied to the CC1 or CC2 contact. The Rd impedance may be about 5.1 Kohm.

If it is determined that there is no foreign object at the CC1 contact or the CC2 contact, based on the applied impedance, the first sensing circuit 810 may transmit a control signal to the toggling control circuit 820.

If the voltage of each of the CC1 contact and the CC2 contact is toggled under control of the toggling control circuit 820, the operating modes of the electronic device 101 and the external device 201 may be designated based on the voltage detected at the CC1 contact and the CC2 contact.

According to various embodiments of the present disclosure, in the case where the Rd impedance is applied to the CC1 contact or the CC2 contact, the external device 201 may operate as a power sink receiving power, and the electronic device 101 may be designated as a power source supplying the power. For example, a situation where the external device 201 operates as the power sink may be a situation where the external device 201 operates as the device of a DRP or a device connected to a Micro-B legacy receptacle defined in a USB TYPE-C standard.

According to another embodiment, in FIG. 9C, in the case where a pull-down resistor Ra 930 is connected to a VCONN contact of the external device 201, a Ra impedance according to the pull-down resistor Ra 930 of the external device 201 may be applied to the CC1 or CC2 contact. The Ra impedance may be about 1 Kohm. According to various embodiments, after a connection between the electronic device 101 and the external device 201 is established, the VCONN contact may perform a role of a power contact instead of a VBUS contact. The VCONN contact may not comply with a USB PD standard supporting a high voltage and may apply a voltage fixed to about 5 V as a contact independent of the VBUS contact.

In a state where the pull-down resistor Ra 930 is connected to the VCONN contact of the external device 201, as illustrated in FIG. 9B, the pull-down resistor Rd 920 may be connected to the CC contact of the external device 201.

If it is determined that there is no foreign object at the CC1 contact or the CC2 contact, based on the applied impedance, the first sensing circuit 810 may transmit a control signal to the toggling control circuit 820.

If the voltage of each of the CC1 contact and the CC2 contact is toggled under control of the toggling control circuit 820, the operating modes of the electronic device 101 and the external device 201 may be designated based on the voltage detected at the CC1 contact and the CC2 contact.

In the case where the Ra impedance is applied to the CC1 contact or the CC2 contact, the external device 201 may operate as a power sink receiving power, and the electronic device 101 may be designated as a power source supplying the power. For example, a situation where the external device 201 operates as the power sink may be a situation where the external device 201 operates as the device of a DRP or a device connected to a Micro-B legacy receptacle defined in a USB TYPE-C standard.

In particular, the situation where the power is supplied through the VCONN contact may be the situation where the external device 201 operates as an audio accessory defined in the USB TYPE-C standard.

In the meantime, as illustrated in FIG. 10, a resistance component may occur at the CC contact of the external connector 2000 by the foreign object. In this case, an abnormal voltage according to the resistance component may be applied to the CC1 or CC2 contact. For example, in the case where the foreign object is moisture or brine, the resistance component within several tens Mohm may occur at the CC1 or CC2 contact. In this case, the resistance component that causes electrolytic corrosion may be the resistance component between, for example, and without limitation, about 10 Kohm to about 1 Mohm.

The first sensing circuit 810 may not transmit the control signal to the toggling control circuit 820 if it is determined that the foreign object is present at the CC1 or CC2 contact, based on the applied voltage.

As such, a toggling operation may not be performed at the CC1 and CC2 contact. Since the impedance according to the pull-up resistor Rp or the pull-down resistor Rd is not applied thereto, the operating modes of the electronic device 101 and the external device 201 may not be designated.

Figure 11A:
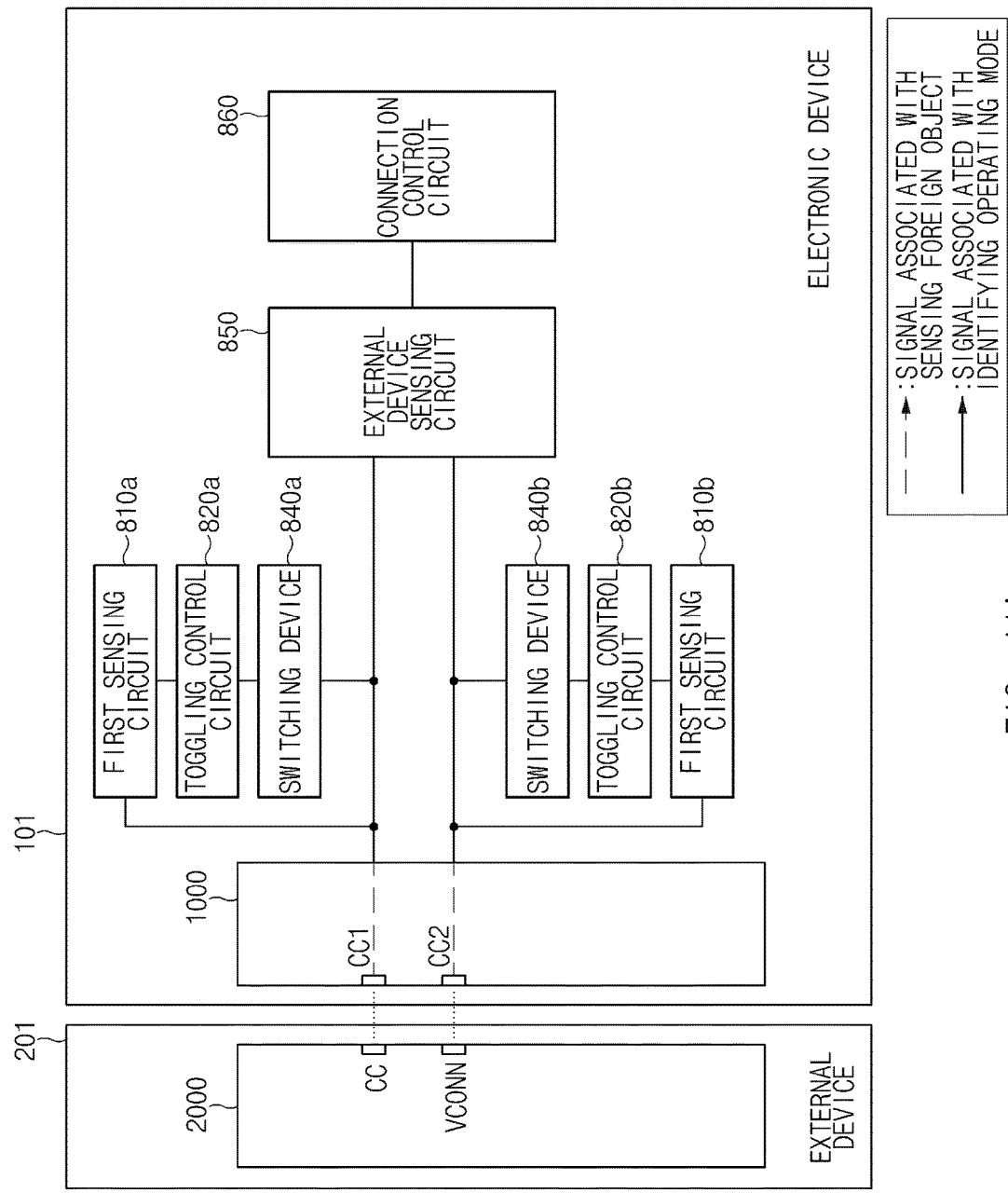
Figure 11B:
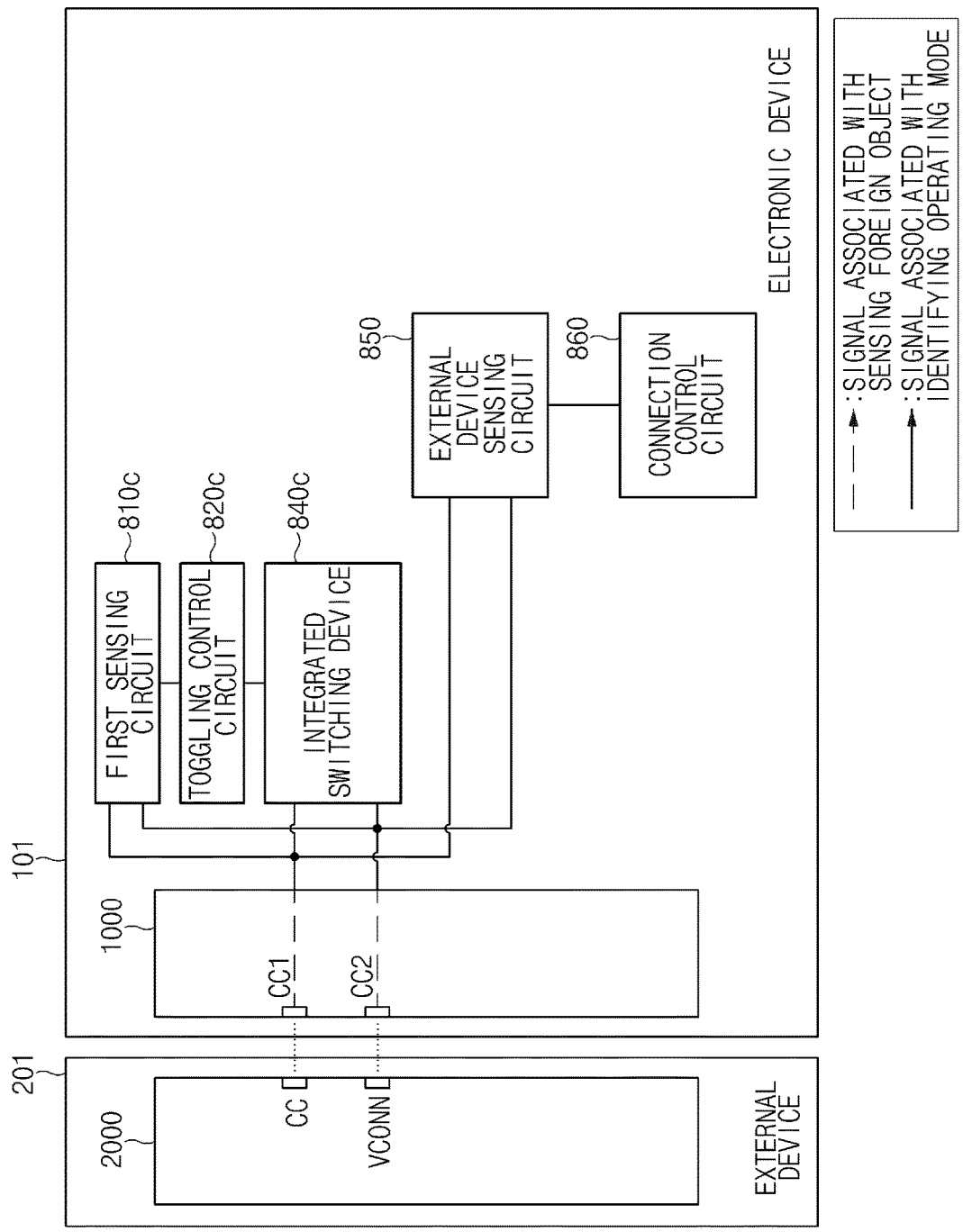

FIGS. 11A to 11B are circuit diagrams illustrating an example electronic device supporting a USB interface, according to various example embodiments of the present disclosure.

FIG. 11A is a circuit including switching devices that toggle the voltage of each of a CC1 contact and a CC2 contact, respectively. FIG. 11B a circuit including an integrated switching device that toggles the voltage of each of the CC1 contact and the CC2 contact.

In FIG. 11A, a first sensing circuit 810a may detect at least one of a voltage, a current, and impedance applied to the CC1 contact. If it is determined that there is no foreign object at the CC1 contact, the first sensing circuit 810a may transmit a control signal to a toggling control circuit 820a.

If the toggling control circuit 820a receiving the control signal activates a switching device 840a, the voltage of the CC1 contact may be periodically toggled. As such, the external device sensing circuit 850 may detect at least one of the voltage, the current, and the impedance, which are applied to the CC1 contact, and may transmit a first control signal according to the detected result to the connection control circuit 860.

According to various embodiments of the present disclosure, a second sensing circuit 810b may detect at least one of a voltage, a current, and impedance applied to the CC2 contact. If it is determined that there is no foreign object at the CC2 contact, the second sensing circuit 810b may transmit a control signal to a toggling control circuit 820b.

If the toggling control circuit 820b receiving the control signal activates a switching device 840b, the voltage of the CC2 contact may be periodically toggled. As such, the external device sensing circuit 850 may detect at least one of the voltage, the current, and the impedance applied to the CC2 contact and may transmit a second control signal according to the detected result to the connection control circuit 860.

The connection control circuit 860 may identify the operating mode of the electronic device 101 based on the received first control signal and the received second control signal.

As another example, in FIG. 11B, a first sensing circuit 810c may detect at least one of the voltage, the current and the impedance applied to the CC1 contact and the CC2 contact. In addition, if it is determined that there is no foreign object at both the CC1 contact and the CC contact, the first sensing circuit 810c may transmit a control signal to a toggling control circuit 820c.

If the toggling control circuit 820c receiving the control signal activates an integrated switching device 840c, the voltage of each of the CC1 contact and the CC2 contact may be selectively toggled. As such, the external device sensing circuit 850 may detect at least one of the voltage, the current, and the impedance, which are applied to the CC1 contact and the CC2 contact, and may transmit a control signal according to the detected result to the connection control circuit 860.

The connection control circuit 860 may identify the operating mode of the electronic device 101 based on the received control signal.

According to various example embodiments, the electronic device 101 is provided. The electronic device 101 may include a housing, a display device exposed through a first part of the housing, a recess formed in a second part of the housing, a receptacle formed in the recess, a plurality of conductive contacts disposed inside the receptacle and including a first contact, a first circuit configured to supply and/or receive a current of a first level or larger to and/or from the first contact when an external connector is inserted into the receptacle, a first switching device configured to electrically connect the first circuit with the first contact or to interrupt a connection between the first circuit and the first contact, a second circuit configured to sense existence of a foreign object contacting the first contact while the external connector is inserted into the receptacle and a control circuit configured to control the first switching device based at least partly on sensing the existence of the foreign object.

According to an example embodiment, the plurality of conductive contacts may be disposed to be suitable for a USB type C standard.

According to an example embodiment, the first contact may include a CC1 contact or a CC2 contact, which is defined according to a USB type C standard.

According to an example embodiment, the first level may be not less than about 80 μA.

According to an example embodiment, the second circuit may include a comparator having a first input, a second input, and an output, wherein the first input is electrically connected with a circuit supplying a threshold voltage for determining whether the foreign object is present, wherein the second input is electrically connected with the first contact, and wherein the output is electrically connected with the control circuit.

According to an example embodiment, the control circuit may include an application processor, and a memory electrically connected with the application processor and configured to store firmware controlling the first switching device.

According to an example embodiment, the electronic device may further include a memory electrically connected with the control circuit, wherein the memory stores instructions that, when executed, cause the control circuit to provide a notification through the display device and/or change an operation of the electronic device, based at least partly on the existence of the foreign object.

According to various example embodiments, the electronic device 101 may further include a memory electrically connected with the control circuit. The memory may store instructions that, when executed, cause the control circuit to provide notification through the display device and/or to change an operation of the electronic device, based at least partly on existence of the foreign object.

According to an example embodiment, the first contact may include a VBUS contact.

According to an example embodiment, the first contact may include a SBU1 contact or a SBU2 contact, which is defined according to a USB type C standard.

According to an example embodiment, the electronic device may further include a third circuit configured to identify an operating mode of the electronic device based on at least one of a voltage, a current, or impedance, which is detected at the first contact.

According to an example embodiment, at least part of sensing the existence of the foreign object is configured to be determined by a control signal that is received from the second circuit depending on the existence of the foreign object.

According to an example embodiment, wherein the controlling, by the control circuit, of the first switching device may include allowing the first circuit to apply a current or a voltage to the first switching device.

According to an example embodiment, the control circuit may allow the first circuit not to apply a current or a voltage to the first switching device when the external connector is inserted into the receptacle.

According to an example embodiment, wherein the sensing, by the second circuit, of the existence of the foreign object may include detecting whether a level of a voltage or a current applied to the first contact is not less than a threshold value or is not greater than the threshold value.

According to an example embodiment, wherein the foreign object is a material allowing the first contact to be electrolytically corroded when a current is applied to the first contact.

According to various example embodiments, the electronic device 101 may further include an application processor and a memory electrically connected with the application processor. The memory may store instructions that, when executed, cause the application processor to provide notification through the display device and/or to change an operation of the electronic device, based at least partly on existence of the foreign object.

Figure 12:
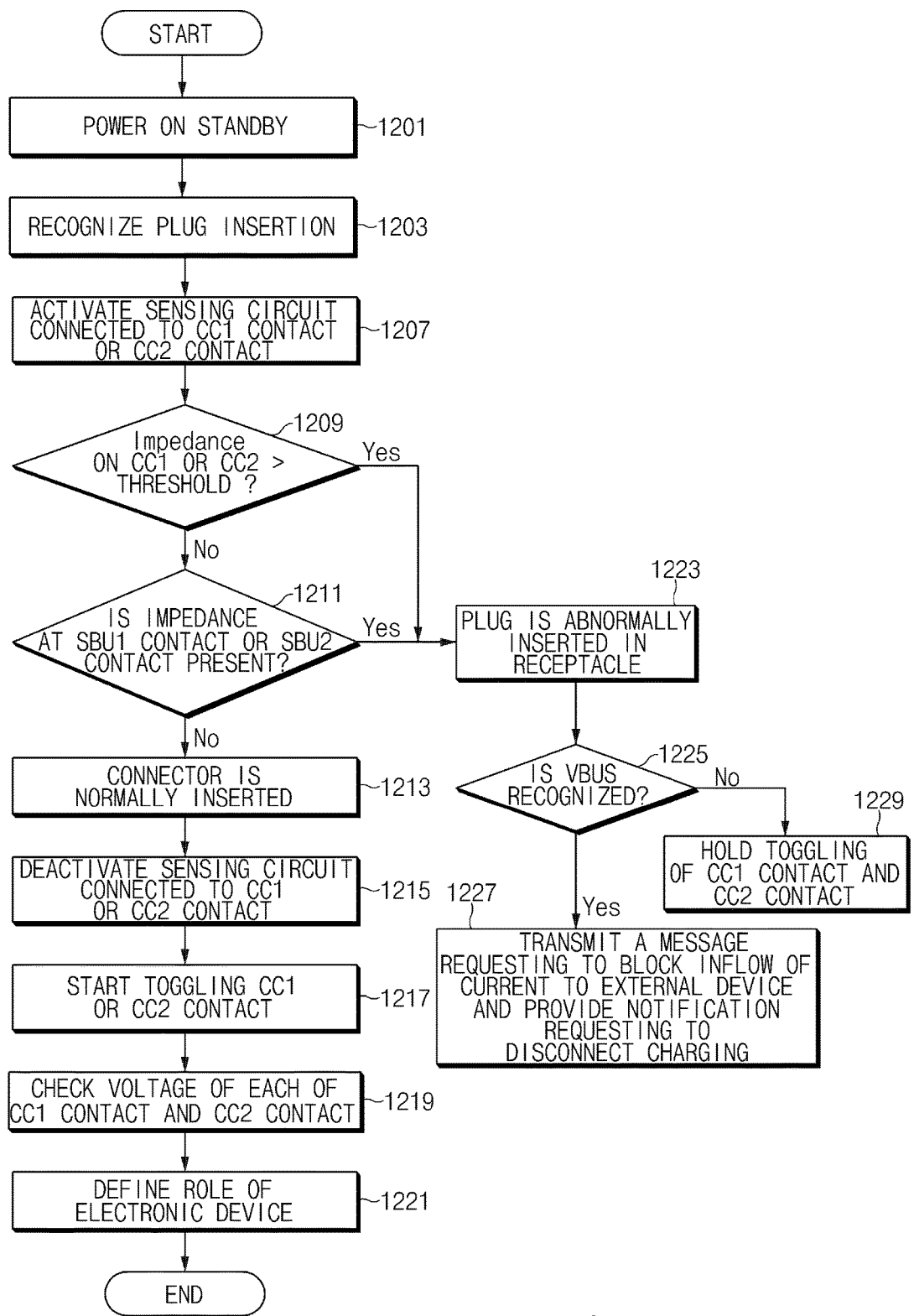
FIG. 12 is a flowchart illustrating an example method of controlling a USB interface of an electronic device, according to various example embodiments of the present disclosure.

FIG. 12 is a flowchart illustrating an example method of controlling a USB interface of an electronic device, according to an example embodiment of the present disclosure.

In operation 1201 of FIG. 12, in a state where an external device is standby after being powered on, in operation 1203, the electronic device 101 may recognize the external connector 2000 (or a plug) inserted into the receptacle 1000. According to various embodiments of the present disclosure, the electronic device 101 may change the mode of the connection control circuit 860 determining an operating mode from a sleep mode to a wakeup mode.

In this case, the toggling of a CC1 or CC2 contact may be in a held state. For example, the toggling control circuit 820 may be controlled such that toggling of the CC1 or CC2 contact is held.

In this case, in operation 1207, the connection control circuit 860 may activate the first sensing circuit 810 connected to the CC1 contact or the CC2 contact.

In operation 1209, the first sensing circuit 810 may determine whether impedance applied to the CC1 or CC2 contact is greater than a threshold value (e.g., 10 Kohm).

If it is determined in operation 1209 that the impedance is greater than the threshold value (Yes), the first sensing circuit 810 may transmit a control signal for providing notification of the existence of a foreign object at the CC1 contact or CC2 contact to the connection control circuit 860 or the system unit 870.

If it is determined in operation 1209 that the impedance is not greater than the threshold value (No), in operation 1211, the second sensing circuit 880 may determine whether the impedance is present at a SBU1 contact or a SBU2 contact.

According to various embodiments, the second sensing circuit 880 may determine whether the impedance applied to the SBU1 or SBU2 contact is greater than the threshold value.

If it is determined in operation 1211 that the impedance is present (Yes), the second sensing circuit 880 may transmit a control signal for providing notification of the existence of a foreign object to the connection control circuit 860 or the system unit 870. In this case, operation 1211 may be performed before operation 1209.

On the other hand, if it is determined in operation 1211 that there is no impedance (No), in operation 1213, it may be determined that the external connector 2000 (or a plug) is normally inserted into the receptacle without the inflow of the foreign object.

As such, in operation 1215, the first sensing circuit 810 connected to the CC1 or CC2 contact may be deactivated. Since a current is applied to the CC1 or CC2 contact under control of the toggling control circuit 820, in operation 1217, the voltage of each of the CC1 contact and the CC2 contact may be periodically toggled between a pull-up state H and a pull-down state L.

If the voltage of the CC1 or CC2 contact is toggled, in operation 1219, the external device sensing circuit 850 of the electronic device 101 may check at least one of a voltage, a current, and impedance that are applied to the CC1 contact and the CC2 contact.

Next, in operation 1221, the connection control circuit 860 may define the role of the electronic device 101 depending on the voltage applied to the CC1 contact or the CC2 contact.

If the control signal for providing notification of the existence of the foreign object is received in operation 1211 from the first sensing circuit 810 and the second sensing circuit 880 (Yes), in operation 1223, the connection control circuit 860 or the system unit 870 may determine that the external connector is abnormally inserted in the receptacle in which the foreign object flows.

As such, in operation 1225, the connection control circuit 860 may activate the third sensing circuit 890, and the third sensing circuit 890 may determine that the VBUS contact is recognized. In other words, in operation 1225, the third sensing circuit 890 may determine that at least one of a voltage, a current, or impedance is applied to a VBUS contact.

If it is determined in operation 1225 that the VBUS contact is recognized (Yes), the connection control circuit 860 may transmit a message for requesting to block the inflow of the current to the external device 201, through D− and D+ contacts. Alternatively, if the connection control circuit 860 transmits an interrupt message to the system unit 870, in operation 1227, the system unit 870 may provide a user with a pop-up notification for requesting to disconnect the connection to the external device 201.

On the other hand, if it is determined in operation 1225 that the voltage is not applied to the VBUS contact (No), in operation 1229, the connection control circuit 860 may hold the toggling of the CC1 contact and the CC2 contact.

According to various embodiments, operation 1229 may be performed before operation 1225.

According to various embodiments of the present disclosure, the connection control circuit 860 may control the toggling control circuit 820 such that the power providing circuit 830 applies the current to the switching device 840.

As described above, at least part of operations of sensing a foreign object of the electronic device 101 may be implemented with a program module (e.g., instructions stored in the storage medium in the form of firmware). In this case, the storage medium may be a storage unit of an identification circuit that identifies operating modes of the electronic device 101 and the external device 201. Alternatively, the storage medium may be the storage unit of the system unit 870.

In the present disclosure, for example, the storage unit of the identification circuit or the storage unit of the system unit 870 may correspond to the memory 130 of FIG. 1 and the memory 230 of FIG. 2.

FIG. 13 is a table illustrating example voltage detected at an identification contact, according to an example embodiment of the present disclosure.

In FIG. 13, a device, which is operating as a power source, of the electronic device 101 and the external device 201 may supply power of 500 mA@5 V complying with a USB 2.0 standard, may operate in a default mode 1310 in which power of 900 mA@5 V complying with a USB 3.1 standard is supplied, may operate in a first high-power device dedicated mode 1320 in which power of 1.5 A@5 V is supplied or may operate in a second high-power device dedicated mode 1330 supplying power of 3.0 A@5 V.

In this case, in the default mode 1310, in the case where a current applied in a normal state where a foreign object does not flow in the CC1 contact or the CC2 contact is about 80 uA, a voltage detected at the CC1 contact or the CC2 contact may be detected as about 412 mV when a pull-down resistor Rd of about 5.1 Kohm is connected. In the case where a current applied in a normal state where the foreign object does not flow in the CC1 contact or the CC2 contact is about 80 uA, the voltage detected at the CC1 contact or the CC2 contact may be detected as about 80 mV when a pull-down resistor Ra of about 1 Kohm is connected. In the case where a current applied in a normal state where the foreign object does not flow in the CC1 contact or the CC2 contact is about 80 uA, the voltage detected when a pull-up resistor Rp is connected or in an open state may be detected as about 2.4 V.

On the other hand, in the default mode 1310, in a state where the foreign object flows in the CC1 contact or the CC2 contact, resistance component exceeding 5.1 Kohm may occur at the CC1 contact or CC2 contact due to the foreign object. As such, a voltage having a value between about 412 mV and 2.4 V may be detected at the CC1 contact or the CC2 contact (1311).

According to various embodiments, in the first high-power device dedicated mode 1320 for supplying power of 1.5 A@5 V, in the case where a current applied in a normal state where a foreign object does not flow in the CC1 contact or the CC2 contact is about 180 uA, a voltage detected at the CC1 contact or the CC2 contact may be detected as about 918 mV when a pull-down resistor Rd of about 5.1 Kohm is connected. In the case where a current applied in a normal state where the foreign object does not flow in the CC1 contact or the CC2 contact is about 180 uA, the voltage detected at the CC1 contact or the CC2 contact may be detected as about 180 mV when a pull-down resistor Ra of about 1 Kohm is connected. In the case where a current applied in a normal state where the foreign object does not flow in the CC1 contact or the CC2 contact is about 180 uA, the voltage detected when a pull-up resistor Rp is connected or in an open state may be detected as about 2.4 V.

On the other hand, in the first high-power device dedicated mode 1320, when the resistance component exceeding 5.1 Kohm occurs at the CC1 contact or CC2 contact due to the foreign object in a state where the foreign object flows in the CC1 contact or the CC2 contact, the voltage detected at the CC1 contact or the CC2 contact may be a value between about 918 mV and 2.4 V (1321).

According to various embodiments, in the second high-power device dedicated mode 1330 for supplying power of 3.0 A@5 V, in the case where a current applied in a normal state where a foreign object does not flow in the CC1 contact or the CC2 contact is about 330 uA, a voltage detected at the CC1 contact or the CC2 contact may be detected as about 1.683 V when a pull-down resistor Rd of about 5.1 Kohm is connected. In the case where a current applied in a normal state where the foreign object does not flow in the CC1 contact or the CC2 contact is about 330 uA, the voltage detected at the CC1 contact or the CC2 contact may be detected as about 330 mV when a pull-down resistor Ra of about 1 Kohm is connected. In the case where a current applied in a normal state where the foreign object does not flow in the CC1 contact or the CC2 contact is about 330 uA, the voltage detected when a pull-up resistor Rp is connected or in an open state may be detected as about 2.4 V.

On the other hand, in the second high-power device dedicated mode 1330, when the resistance component exceeding 5.1 Kohm occurs at the CC1 contact or CC2 contact due to the foreign object in a state where the foreign object flows in the CC1 contact or the CC2 contact, the voltage detected at the CC1 contact or the CC2 contact may be a value between about 1.683V and 2.4 V (1322).

Figure 14:
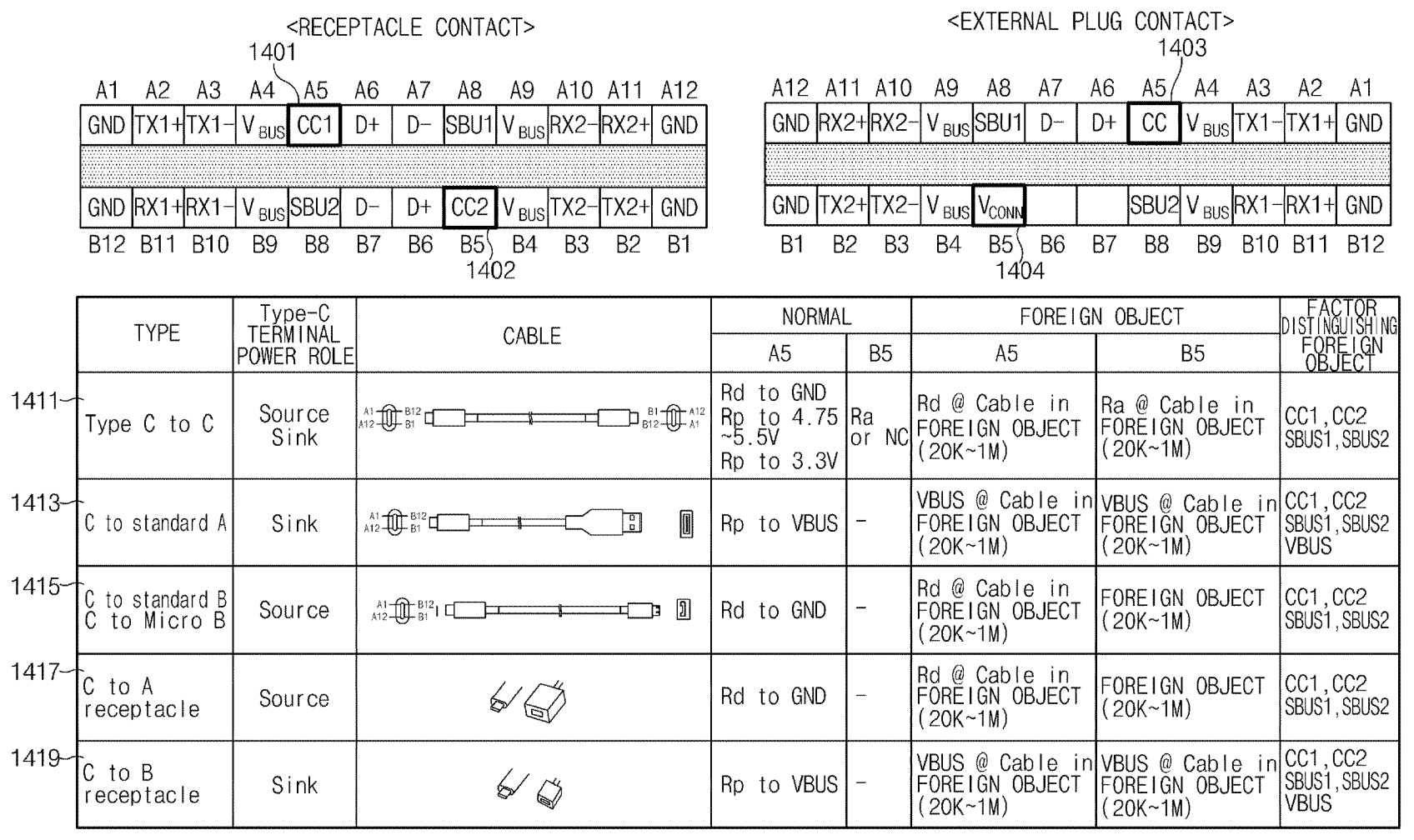

FIG. 14 is a table illustrating example impedance detected at an identification contact depending on existence of a foreign object, according to an example embodiment of the present disclosure.

In FIG. 14, when the external connector 2000 is inserted into the receptacle 1000, a CC1 contact 1401 and a CC contact 1403 are connected with each other and are referred to as "A5 contact". When the external connector 2000 is inserted into the receptacle 1000, a CC2 contact 1402 and a VCONN 1404 contact are connected with each other and are referred to as "B5 contact". Meanwhile, according to the USB 3.1 TYPE-C, in contrast to the above-described insertion manner, in the case where the external connector 2000 is inserted into the receptacle 1000 with the external connector 2000 turned over, location at which the contacts are connected may be changed. For example, the CC1 contact 1401 may be connected with the VCONN 1404 contact, and the CC2 contact 1402 may be connected with the CC contact 1403.

According to an embodiment, as described in an item 1411, in the case where a cable type complies with "Type C to C", an electronic device may operate as a power source or a power sink in a DRP mode. In this case, if there is no foreign object at a A5 contact and a B5 contact, a normal voltage level according to a pull-up resistor Rp or a pull-down resistor Rd may be detected at the A5 contact depending on the operating mode of the electronic device. In this case, for example, the voltage level according to the pull-up resistor Rp may be a voltage between about 3.3 V and 5.5 V depending on a USB TYPE-C standard. According to various embodiments, a voltage level according to the pull-down resistor Ra may be detected at the B5 contact depending on the operating mode of the electronic device. Alternatively, an open state may be detected at the B5 contact.

On the other hand, in the case where a foreign object is present at the A5 contact and the B5 contact, abnormal impedance of 5.1 Kohm or more may be formed at the A5 contact and the B5 contact. In particular, in the case of brine with high corrosion possibility, impedance of a 10 Kohm to 1 Mohm range may be formed. For example, as described in the item 1411, in the case where the impedance according to a pull-down resistor Rd is applied to the A5 contact, the impedance of 20 Kohm to 10 Mohm may be measured. Even though the impedance according to a pull-down resistor Ra is applied to the B5 contact, the impedance of 20 Kohm to 10 Mohm may be measured.

In this case, for example, receptacle contacts used to detect whether the foreign object is present may be CC1, CC2, SBU1, and SBU2 contacts.

As another example, as described in an item 1413, in the case where a cable type complies with "C to Standard A", an external device may operate as the power source, and the electronic device may operate as the power sink. According to various embodiments, as described in an item 1419, even though a cable type complies with "C to B receptacle", the external device may operate as the power source, and the electronic device may operate as the power sink.

In this case, if there is no foreign object at the A5 contact and the B5 contact, a normal voltage level VBUS according to the pull-up resistor Rp may be detected at the A5 contact.

On the other hand, in the case where a foreign object is present at the A5 contact and the B5 contact, abnormal impedance of 5.1 Kohm or more may be formed at the A5 contact and the B5 contact. In particular, in the case of brine with high corrosion possibility, impedance of a 10 Kohm to 1 Mohm range may be formed. For example, as described in the item 1413, in the case where the VBUS voltage according to a pull-down resistor Rd is applied to the A5 contact, the impedance of 20 Kohm to 10 Mohm may be measured. Even though the VBUS voltage is applied to the B5 contact, the impedance of 20 Kohm to 10 Mohm may be measured.

In this case, for example, receptacle contacts used to detect whether the foreign object is present may be CC1, CC2, SBU1, SBU2, and VBUS contacts.

As another example, as described in an item 1415, in the case where the cable type complies with "C to Standard B or C to Micro B", an external device may operate as the power sink, and the electronic device may operate as the power source. According to various embodiments, as described in an item 1417, even though the cable type complies with "C to A receptacle", the external device may operate as the power sink, and the electronic device may operate as the power source.

In this case, if there is no foreign object at the A5 contact and the B5 contact, normal impedance Rd according to a pull-down resistor Rd may be detected at the A5 contact.

On the other hand, in the case where a foreign object is present at the A5 contact and the B5 contact, abnormal impedance of 5.1 Kohm or more may be formed at the A5 contact and the B5 contact. In particular, in the case of brine with high corrosion possibility, impedance of a 10 Kohm to 1 Mohm range may be formed. For example, as described in the item 1415, even though the impedance according to a pull-down resistor Rd is applied to the A5 contact, the impedance of 20 Kohm to 10 Mohm may be measured, and the impedance of 20 Kohm to 10 Mohm may be measured at the B5 contact.

In this case, for example, receptacle contacts used to detect whether the foreign object is present may be CC1, CC2, SBU1, and SBU2 contacts.

In the meantime, it is apparent that a table for describing the impedance that is detected at an A identification contact depending on whether the above-described foreign object is present is not limited to the above-described A5 contact and B5 contact and is applied all contacts of a USB 3.1 Type-C connector (a plug or a receptacle). For example, in the case where there is no foreign object at the USB 3.1 Type-C connector, a normal voltage level may be detected at all the contacts of the connector.

On the other hand, in the case where the foreign object is present at the USB 3.1 Type-C connector, an abnormal voltage level or impedance may be detected at a specific contact, in which the foreign object is present, from among the contacts of the connector. In this case, a contact, to which a sensing circuit is connected and which senses the foreign object may be at least one of the CC1 contact, the CC2 contact, the SBU1 contact, the SBU2 contact, and VBUS contact. According to various embodiments, the D+ contact, the D− contact, the RX+ contact, the RX− contact, the TX+ contact, and the TX− contact instead of the SBU1 and SBU2 contacts may serve as a contact for sensing the foreign object depending on the configuration of the sensing circuit according to an embodiment of the present disclosure.

Figure 15:
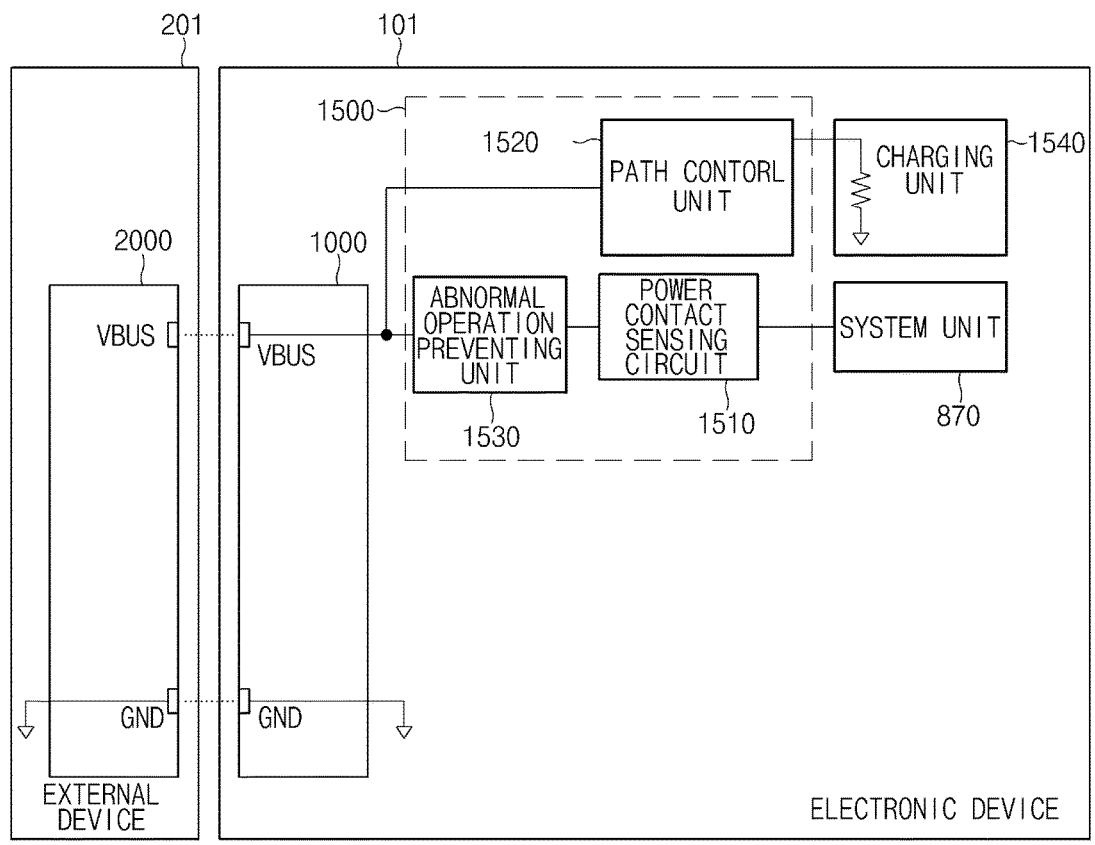
FIG. 15 is a circuit diagram illustrating an example electronic device controlling a USB interface, according to various example embodiments of the present disclosure.

FIG. 15 is a control circuit illustrating an example electronic device including a circuit sensing a foreign object of a USB power contact, according to another example embodiment of the present disclosure.

In FIG. 15, a foreign object sensing circuit 1500 may include a power contact sensing circuit 1510, a path control unit 1520, and an abnormal operation preventing unit 1530.

The foreign object sensing circuit 1500 may be connected with a VBUS contact, and the foreign object sensing circuit 1500 may block a power supply from a host or may provide a notification message to a user, based on a voltage, a current and impedance detected at the VBUS contact.

In the case where the VBUS contact is connected to any other peripheral contact or grounded, by a foreign object (e.g., moisture), a resistance component may occur at a power contact. For example, in the case where the foreign object is moisture or brine, the resistance component of several tens Mohm or less may occur at the VBUS contact. In this case, the resistance component that causes electrolytic corrosion may be the resistance component between about several hundred Kohm to about 1 Mohm.

The power contact sensing circuit 1510 may be a circuit that is configured to sense whether the foreign object contacting the VBUS contact is present, based on at least one of the voltage, the current, and the impedance detected at the VBUS contact. In the case where existence of the foreign object is sensed, the power contact sensing circuit 1510 may transmit a control signal (e.g., an IRQ) for providing notification of the existence of the foreign object to the system unit 870 or an connection control circuit (not illustrated) (e.g., the connection control circuit 860 of FIG. 8).

To protect the overvoltage applied to the electronic device 101 and to improve stability, the path control unit 1520 may be a circuit that disconnects a connection of a charging unit 1540 connected to a power contact or sets the connection. In particular, in the case where power is not applied to the VBUS contact, the path control unit 1520 may include a resistor of about 5 Mohm connected with a ground as an input resistor for protecting the power contact sensing circuit 1510 sensing the VBUS contact.

In the case where the power is applied to a power contact, the abnormal operation preventing unit 1530 may be a circuit that protects the power contact sensing circuit 1510 from an electrical stress (e.g., electrical overstress (EOS), electrostatic discharge (ESD), a surge, a reverse voltage, or the like) of the inside or outside of the electronic device 101.

The abnormal operation preventing unit 1530 may include a protection element (e.g., a reverse voltage preventing diode) or the like to protect the power contact sensing circuit 1510 from a voltage (e.g., 5 V, 9 V, or the like) applied to the VBUS contact. Alternatively, the abnormal operation preventing unit 1530 may include a protection element (e.g., a series resistor, a TVS diode, or the like) to protect the power contact sensing circuit 1510 from the electrical stress such as the EOS, the ESD, or the like.

According to an embodiment, when the power from the external device 201 is not applied to the VBUS contact, the path control unit 1520 may disconnect the connection between the VBUS contact and the charging unit 1540.

In this case, if the foreign object flows in the VBUS contact, the resistance component may occur between the power contact and the ground GND.

If the voltage of the VBUS contact is changed due to the resistance component, the power contact sensing circuit 1510 may determine whether the foreign object is present at the VBUS contact, based on a range of the changed voltage. The power contact sensing circuit 1510 may be implemented to include a comparator. The configuration thereof may be implemented by using the configuration of the above-described comparator of FIG. 8.

If it is determine that the foreign object is present at the VBUS contact, the power contact sensing circuit 1510 may transmit a control signal for providing notification of the existence of the foreign object to the system unit 870. In this case, the control signal for providing notification of the existence of the foreign object may include information about the amount of the foreign object determined based on whether the foreign object is present, an impedance value of the resistance component occurring due to the foreign object, or the impedance value, or the like.

The system unit 870 receiving the control signal may control the operation of other circuits that applies a current to the VBUS contact or receives the current through the VBUS contact. For example, the system unit 870 may allow the electronic device 101 to be charged or discharged.

According to various embodiments, the system unit 870 may provide a user with a notification message (e.g., a pop-up message) for providing notification of the inflow of the foreign object through a display device. Alternatively, the system unit 870 may block a current flowing through the VBUS contact by providing the control data to the host (e.g., a wall charger) through the D+ and D− contact.

In the meantime, in a state where a foreign object is vaporized or in a state where the user receiving the notification message removes the foreign object, the power contact sensing circuit 1510 may determine whether the foreign object of the VBUS contact is present, again.

If it is determined that there is no foreign object any more at the VBUS contact, the power contact sensing circuit 1510 may transmit a control signal for providing notification that there is no foreign object to the system unit 870. As such, the system unit 870 may control the operation of another circuits connected to the VBUS contact. For example, the system unit 870 may allow the electronic device 101 to be charged.

Figure 16A:
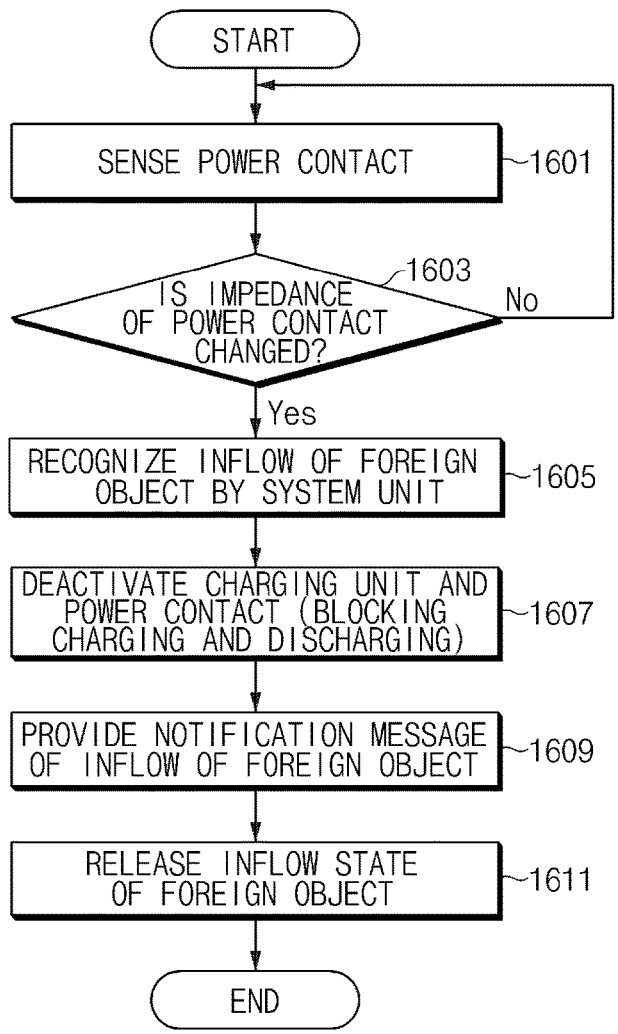
FIGS. 16A, 16B, 16C and 17 are flowcharts illustrating example methods of controlling a USB interface of an electronic device, according to various example embodiments of the present disclosure.
Figure 16B:
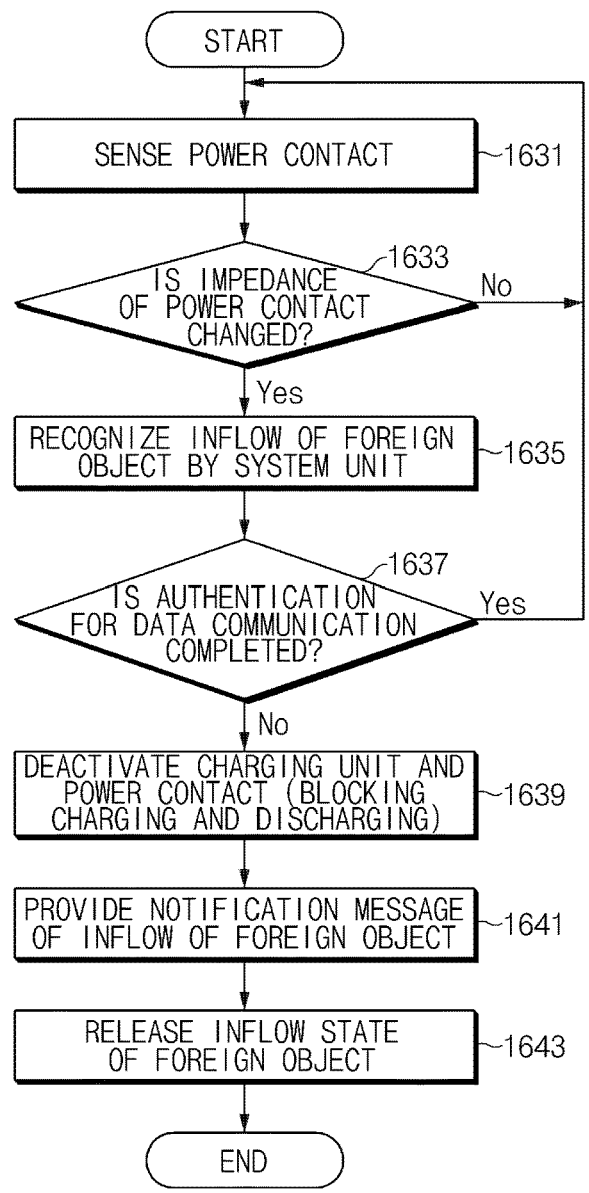
Figure 16C:
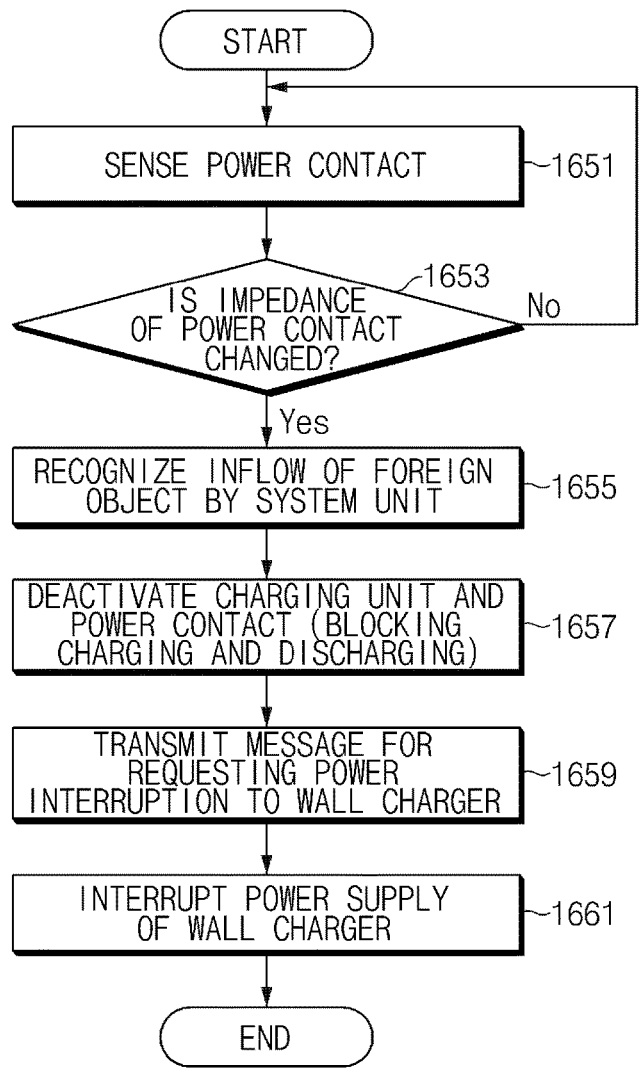

FIGS. 16A, 16B and 16C are flowcharts illustrating example methods for sensing a foreign object of a USB power contact, according to another example embodiment of the present disclosure.

In FIG. 16A, in operation 1601, the power contact sensing circuit 1510 may sense a power contact VBUS.

As such, in operation 1603, the power contact sensing circuit 1510 may determine whether the impedance of the power contact is changed.

If it is determined in operation 1603 that the impedance of the power contact is changed (Yes), the power contact sensing circuit 1510 may transmit a control signal for providing notification of the existence of the foreign object to the system unit 870.

In operation 1605, the system unit 870 may recognize the inflow of the foreign object. In operation 1607, the system unit 870 may deactivate a charging unit to block the charging and discharging. For example, the system unit 870 may deactivate the operation of the charging unit by changing the state of a field effect transistor (FET) switch of the charging unit into an off state.

According to various embodiments, in operation 1609, the system unit 870 may provide a user with a notification message for providing notification of the existence of the foreign object through a display device.

If the user receiving the notification message removes the foreign object, in operation 1611, the inflow state of the foreign object of the VBUS contact may be released.

As another example, in FIG. 16B, in operation 1631, the power contact sensing circuit 1510 may sense a power contact VBUS.

As such, in operation 1633, the power contact sensing circuit 1510 may determine whether the impedance of the power contact is changed.

If it is determined in operation 1633 that the impedance of the power contact is changed (Yes), the power contact sensing circuit 1510 may transmit a control signal for providing notification of the existence of the foreign object to the system unit 870.

In operation 1635, the system unit 870 may recognize the inflow of the foreign object. In operation 1637, the system unit 870 may determine whether authentication for data communication with the external device 201 is completed.

For example, the impedance of a specific accessory applied to the power contact may have a value similar to the impedance of a resistance component occurring due to brine. In this case, it is difficult for the power contact sensing circuit 1510 to determine whether the foreign object is present.

As such, in the case where the external device 201 is an effective device for performing data communication through the verification of a parameter included in a data line, the system unit 870 may determine that the authentication for which the external device 201 performs the data communication is completed. On the other hand, in the case where the external device 201 is not an effective device for performing the data communication, the external device 201 (or the system unit 870) may determine that the authentication for the data communication is not completed.

If the determined result indicates in operation 1637 that the authentication of the external device 201 is not completed (No), the system unit 870 may perform an operation for blocking charging or discharging in operation 1637 and may notify a user of the inflow of foreign object in operation 1641. Since operation 1639, operation 1641, and operation 1643 correspond to above-described operation 1607, operation 1609, and operation 1611, the detailed descriptions are not repeated here.

As another example, in FIG. 16C, in operation 1651, the power contact sensing circuit 1510 may sense a power contact VBUS.

As such, in operation 1653, the power contact sensing circuit 1510 may determine whether the impedance of the power contact is changed.

If it is determined in operation 1653 that the impedance of the power contact is changed (Yes), the power contact sensing circuit 1510 may transmit a control signal for providing notification of the existence of the foreign object to the system unit 870.

In operation 1655, the system unit 870 may recognize the inflow of the foreign object. In operation 1657, the system unit 870 may deactivate a charging unit to block the charging and discharging.

According to various embodiments, in operation 1659, the system unit 870 may transmit a message for requesting power interruption to a host 201 (e.g., a wall charger) through the D+ and D− contacts.

In operation 1661, the host 201 receiving the message may interrupt power supply through the VBUS contact.

Figure 17:
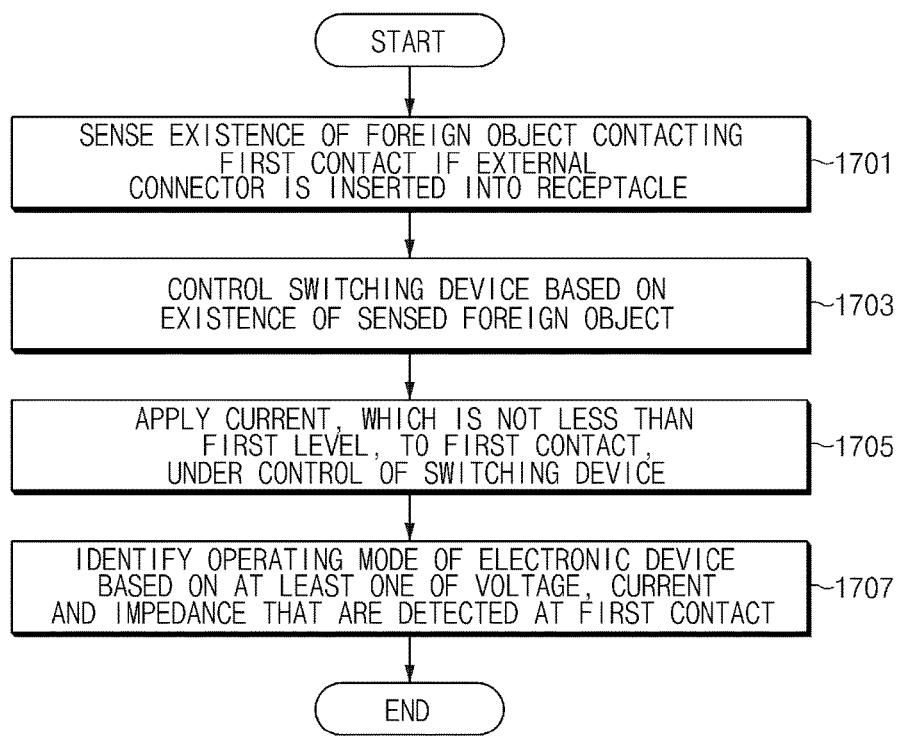

FIG. 17 is a flowchart illustrating an example of the electronic device 101 controlling a USB interface, according to various example embodiments of the present disclosure.

In operation 1701, if the external connector 2000 is inserted into the receptacle 1000, the electronic device 101 may sense whether a foreign object contacting a first contact disposed inside the receptacle 1000 is present. In this case, the first contact may include a CC1 contact or a CC2 contact complying with a "USB type C standard". Alternatively, the first contact may include a SBU1 contact or a SBU2 contact complying with the "USB type C standard". Alternatively, the first contact may include a VBUS contact.

Herein, sensing the existence of the foreign object may include detecting whether a voltage or a current applied to the first contact is not less than a threshold value or is not greater than the threshold value.

Next, in operation 1703, the electronic device 101 may control a switching device based at least in part on sensing the existence of the sensed foreign object.

At least part of sensing the existence of the sensed foreign object may include the control signal that is received from the circuit sensing the foreign object depending on whether the foreign object is present. According to various embodiments, the controlling, by the electronic device 101, a switching device may include the applying, by the electronic device 101, a current or a voltage to the switching device such that the switching device is activated.

In operation 1705, the electronic device 101 may apply the current, which is not less than a first level, to a first contact, under control of the switching device 840. For example, if the switching device 840 is closed, the electronic device 101 may apply the current, which is not less than the first level, to the first contact.

If the current is applied to the first contact, in operation 1707, the electronic device 101 may identify the operating mode of the electronic device 101 based on at least one of the voltage, the current and impedance that are detected at the first contact.

In the meantime, the electronic device 101 may provide a notification through a display device based at least partly on sensing the existence of the foreign object.

In this case, at least part of information about verifying the existence of the foreign object may include the control signal that is received from the circuit sensing the foreign object depending on the existence of the foreign object.

According to various embodiments of the present disclosure, the contact of a receptacle or a plug may be prevented and/or reduced from being corroded due to a foreign object.

As such, unnecessary power consumption may be reduced, and an abnormal operation of an electronic device may be prevented and/or avoided.

According to various example embodiments, the electronic device may allow a user to remove the foreign object by providing a notification message for providing notification of whether the foreign object is present at a contact of a receptacle or a contact of an external connector (or a plug).

In addition, effects to be obtained or to be predicted by the embodiments of the present disclosure are directly or implicitly disclosed in the detailed description of the embodiments of the present disclosure. For example, various effects to be predicted depending on an embodiment of the present disclosure are disclosed in the above-mentioned details.

According to various example embodiments, a method of controlling an operation of an electronic device is provided. The method may include sensing existence of a foreign object contacting a first contact disposed inside a receptacle if an external connector is inserted into the receptacle including a USB interface, controlling a switching device based at least in part on sensing the existence of the foreign object and applying a current of a first level or larger to the first contact under control of the switching device.

According to an example embodiment, the first contact may include a CC1 contact or a CC2 contact, which complies with a USB type C standard.

According to an example embodiment, the method may further include providing a notification through a display device based at least partly on sensing the existence of the foreign object.

According to an example embodiment, the method may further include identifying an operating mode of the electronic device based on at least one of a voltage, a current, and impedance, which are detected at the first contact.

According to an example embodiment, the sensing of the existence of the foreign object may include detecting whether a voltage or a current applied to the first contact is not less than a threshold value or is not greater than the threshold value, and wherein at least part of sensing the existence of the foreign object is configured to be determined based on a control signal received from a circuit sensing the existence of the foreign object depending on whether the foreign object is present.

An electronic device supporting a USB interface and a method of operating the same according to one example of various example embodiments of the present disclosure have been described with reference to the embodiments illustrated in the drawings to give the understanding. However, this is only an example embodiment, and it will be understood that various modifications and other equivalent embodiments are possible from this point by those skilled in the art.

While various example embodiments of the present disclosure have been illustrated and described herein, it will be understood that the various embodiments are intended to be illustrative, and not limiting. Accordingly, those skilled in the art will understand that various modifications, variations and alternatives will be apparent without departing from the spirit and scope of the disclosure as defined by the appended claims and their equivalents.

What is claimed is:

1. An electronic device comprising:
   a housing:
   a display device exposed through a first part of the housing;
   a recess formed in a second part of the housing;
   a receptacle formed in the recess;
   a plurality of conductive contacts disposed inside the receptacle and including a first contact;
   a first circuit configured to supply and/or receive a current of a first level or larger to and/or from the first contact when an external connector is inserted into the receptacle;
   a first switching device comprising switching circuitry configured to electrically connect the first circuit with the first contact or to interrupt an electrical connection between the first circuit and the first contact;
   a second circuit configured to detect existence of a foreign object comprising moisture contacting the first contact while the external connector is inserted into the receptacle; and
   a control circuit configured to control the first switching device based at least in part on information regarding the detected existence of the foreign object comprising moisture, wherein the control circuit is a toggling circuit, and wherein the control circuit is configured to control the first switching device so as to toggle between allowing the first circuit to apply, and not apply, a current or a voltage to the first switching device.

2. The electronic device of claim 1, wherein the plurality of conductive contacts are disposed to be compatible with a USB type C standard.

3. The electronic device of claim 1, wherein the first contact includes a CC1 contact or a CC2 contact defined according to a USB type C standard.

4. The electronic device of claim 1, wherein the first level is not less than about 80 µA.

5. The electronic device of claim 1, wherein the second circuit comprises a comparator having a first input, a second input, and an output,
   wherein the first input is electrically connected with a circuit supplying a threshold voltage for determining whether the foreign object is present,
   wherein the second input is electrically connected with the first contact, and
   wherein the output is electrically connected with the control circuit.

6. The electronic device of claim 1, wherein the control circuit comprises:
   an application processor, and
   a memory electrically connected with the application processor and configured to store firmware for controlling the first switching device.

7. The electronic device of claim 1, further comprising:
   a memory electrically connected with the control circuit,
   wherein the memory stores instructions that, when executed, cause the control circuit to:
   provide a notification and/or change an operation of the electronic device, based at least in part on the existence of the foreign object.

8. The electronic device of claim 1, wherein the first contact includes a VBUS contact.

9. The electronic device of claim 1, wherein the first contact includes a SBU1 contact or a SBU2 contact defined according to a USB type C standard.

10. The electronic device of claim 1, further comprising:
    a third circuit configured to identify an operating mode of the electronic device based on at least one of: a voltage, a current, or impedance, detected at the first contact.

11. The electronic device of claim 1, wherein at least part of the information regarding the detected existence of the foreign object is configured to be determined by a control signal received from the second circuit depending on the existence of the foreign object.

12. The electronic device of claim 1, wherein the control circuit allows the first circuit to not apply a current or a voltage to the first switching device when the external connector is inserted into the receptacle.

13. The electronic device of claim 1, wherein the detecting, by the second circuit, of the existence of the foreign object includes:
    determining whether a level of a voltage or a current applied to the first contact is not less than a predetermined value.

14. The electronic device of claim 1, wherein the foreign object is a material causing the first contact to be electrolytically corroded when a current is applied to the first contact.

15. A method of controlling an operation of an electronic device, the method comprising:
    detecting existence of a foreign object comprising moisture contacting a first contact disposed inside a receptacle if an external connector is inserted into the receptacle including a USB interface;

controlling a switching device based at least in part on information regarding the detected existence of the foreign object comprising moisture;

applying a current of a first level or larger to the first contact under control of the switching device; and wherein the controlling the switching device comprises controlling, by a control circuit, the switching device so as to toggle between applying, and not applying, a current or a voltage to the switching device.

16. The method of claim 15, wherein the first contact includes a CC1 contact or a CC2 contact defined according to a USB type C standard.

17. The method of claim 15, further comprising:
providing a notification through a display device based at least in part on information regarding the detected existence of the foreign object.

18. The method of claim 15, further comprising:
identifying an operating mode of the electronic device based on at least one of: a voltage, a current, and impedance, which are detected at the first contact.

19. The method of claim 15, wherein the detecting the existence of the foreign object includes:
detecting whether a voltage or a current applied to the first contact is at least one of: not less than a threshold value, and is not greater than the threshold value, and
wherein at least part of the information regarding the detected existence of the foreign object is determined based on a control signal received from a circuit configured to sense the existence of the foreign object.

\* \* \* \* \*